United States Patent
Yi et al.

(10) Patent No.: US 12,133,217 B2
(45) Date of Patent: Oct. 29, 2024

(54) METHOD AND APPARATUS FOR TRANSMITTING UPLINK CHANNEL IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Sungjin Park, Suwon-si (KR); Jinhyun Park, Suwon-si (KR); Youngrok Jang, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/502,830

(22) Filed: Oct. 15, 2021

(65) Prior Publication Data

US 2022/0124757 A1    Apr. 21, 2022

(30) Foreign Application Priority Data

Oct. 16, 2020 (KR) .......... 10-2020-0134488
Oct. 28, 2020 (KR) .......... 10-2020-0141391

(51) Int. Cl.
*H04W 72/1268* (2023.01)
*H04L 5/00* (2006.01)
*H04L 27/26* (2006.01)

(52) U.S. Cl.
CPC ....... *H04W 72/1268* (2013.01); *H04L 5/0048* (2013.01); *H04L 27/2613* (2013.01)

(58) Field of Classification Search
None
See application file for complete search history.

(56) References Cited

U.S. PATENT DOCUMENTS 11,129,181 B2    9/2021 Lee et al.
11,304,227 B2 *  4/2022 Choe ............... H04W 74/0833
(Continued)

FOREIGN PATENT DOCUMENTS

EP    2 448 158 A2    5/2012
EP    3 471 304 A1    4/2019
(Continued)

OTHER PUBLICATIONS

International Search Report dated Jan. 17, 2022, issued in International Application No. PCT/KR2021/014356.

*Primary Examiner* — Otis L Thompson, Jr.
(74) *Attorney, Agent, or Firm* — Jefferson IP Law, LLP

(57) ABSTRACT

The disclosure relates to a communication technique that converges a $5^{th}$ generation (5G) communication system for supporting a higher data rate after a $4^{th}$ generation (4G) system with IoT technology, and a system thereof. The disclosure may be applied to intelligent services (e.g., smart homes, smart buildings, smart cities, smart or connected cars, healthcare, digital education, retail, security and safety related services, or the like) based on 5G communication technology and Internet of things (IoT)-related technology. A method for transmitting an uplink channel by a base station or a user equipment (UE) in a wireless communication system is provided.

18 Claims, 18 Drawing Sheets

(56) References Cited

U.S. PATENT DOCUMENTS

| | | | |
|---|---|---|---|
| 11,533,745 B2 * | 12/2022 | Hong | H04L 1/0041 |
| 2019/0045390 A1 * | 2/2019 | Davydov | H04W 28/0273 |
| 2019/0074929 A1 * | 3/2019 | Aiba | H04L 1/0025 |
| 2020/0162208 A1 * | 5/2020 | Moon | H04L 1/189 |
| 2020/0267774 A1 * | 8/2020 | Vos | H04W 74/0833 |
| 2020/0280394 A1 | 9/2020 | Sarkis et al. | |
| 2022/0085915 A1 * | 3/2022 | Huang | H04L 5/0051 |
| 2022/0116144 A1 * | 4/2022 | Liu | H04L 1/08 |
| 2022/0346091 A1 * | 10/2022 | Karmoose | H04L 1/0072 |
| 2023/0058672 A1 * | 2/2023 | Guo | H04L 1/0003 |
| 2023/0079557 A1 * | 3/2023 | Guo | H04L 69/24 370/329 |
| 2024/0032024 A1 * | 1/2024 | Dai | H04L 1/08 |

FOREIGN PATENT DOCUMENTS

| | | | | |
|---|---|---|---|---|
| KR | 10-2018-0088568 A | 8/2018 | | |
| KR | 10-2020-0088812 A | 7/2020 | | |
| KR | 10-2021-0043304 A | 4/2021 | | |
| WO | 2017/026871 A1 | 2/2017 | | |
| WO | WO-2020166696 A1 * | 8/2020 | | H04L 1/08 |
| WO | 2021/071343 A1 | 4/2021 | | |

\* cited by examiner

FIG. 3

One symbol pattern (301)

| | |
|---|---|
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |
| 2/3 | CDM group 1 |
| 0/1 | CDM group 0 |

Two symbol pattern (302)

| | |
|---|---|
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |
| 2/3/6/7 | CDM group 1 |
| 0/1/4/5 | CDM group 0 |

One symbol pattern (303)

| | |
|---|---|
| 4/5 | CDM group 2 |
| 4/5 | |
| 2/3 | CDM group 1 |
| 2/3 | |
| 0/1 | CDM group 0 |
| 0/1 | |
| 4/5 | CDM group 2 |
| 4/5 | |
| 2/3 | CDM group 1 |
| 2/3 | |
| 0/1 | CDM group 0 |
| 0/1 | |

Two symbol pattern (304)

| | |
|---|---|
| 4/5/10/11 | CDM group 2 |
| 4/5/10/11 | |
| 2/3/8/9 | CDM group 1 |
| 2/3/8/9 | |
| 0/1/6/7 | CDM group 0 |
| 0/1/6/7 | |
| 4/5/10/11 | CDM group 2 |
| 4/5/10/11 | |
| 2/3/8/9 | CDM group 1 |
| 2/3/8/9 | |
| 0/1/6/7 | CDM group 0 |
| 0/1/6/7 | |

METHOD AND APPARATUS FOR TRANSMITTING UPLINK CHANNEL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0134488, filed on Oct. 16, 2020, in the Korean Intellectual Property Office, and of a Korean patent application number 10-2020-0141391, filed on Oct. 28, 2020, in the Korean Intellectual Property Office, the disclosure of each of which is incorporated by reference herein in its entirety.

BACKGROUND

1. Field

The disclosure relates to a method for transmitting an uplink channel by a base station or a user equipment (UE) in a wireless communication system.

2. Description of Related Art

To meet the demand for wireless data traffic having increased since deployment of 4th generation (4G) communication systems, efforts have been made to develop an improved 5G or pre-5G communication system. Therefore, the 5th generation (5G) or pre-5G communication system is also called a "Beyond 4G Network" communication system or a "Post long term evolution (LTE)" system. The 5G system specified by the 3GPP is called a "new radio (NR)" system. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspect of the disclosure are to address at least the above-mentioned problems and/or disadvantages and to provide at least the advantages described below. Accordingly, an aspect of the disclosure is to provide a method and an apparatus for transmitting an uplink channel in a wireless communication system.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes identifying that a number of symbol for a physical uplink shared channel (PUSCH) is larger than a predetermined number of symbols, identifying a number of resource element (RE) for PUSCH in one physical resource block (PRB), based on the number of symbol for the PUSCH that is larger than the predetermined number of symbols, identifying a number of RE for the PUSCH in allocated PRBs, based on the number of RE for PUSCH in one PRB, identifying transport block size (TBS) for the PUSCH based on the number of RE for PUSCH in allocated PRBs, and transmitting the PUSCH to a base station based on the TBS.

In accordance with another aspect of the disclosure, a terminal in a communication system is provided. The terminal includes a transceiver, and at least one processor configured to identify that a number of symbol for a PUSCH is larger than a predetermined number of symbols, identify a number of RE for PUSCH in one PRB, based on the number of symbol for the PUSCH that is larger than the predetermined number of symbols, identify a number of RE for the PUSCH in allocated PRBs, based on the number of RE for PUSCH in one PRB, identify TBS for the PUSCH based on the number of RE for PUSCH in allocated PRBs, and transmit the PUSCH to a base station based on the TBS.

In accordance with another aspect of the disclosure, a method performed by a base station in a communication system is provided. The method includes identifying that a number of symbol for a PUSCH is larger than a predetermined number of symbols, identifying a number of RE for PUSCH in one PRB, based on the number of symbol for the PUSCH that is larger than the predetermined number of symbols, identifying a number of RE for the PUSCH in allocated PRBs, based on the number of RE for PUSCH in one PRB, identifying TBS for the PUSCH based on the number of RE for PUSCH in allocated PRBs, and receiving the PUSCH from a terminal based on the TBS.

In accordance with another aspect of the disclosure, a base station in a communication system in provided. The base station includes a transceiver and at least one processor configured to identify that a number of symbol for a PUSCH is larger than a predetermined number of symbols, identify a number of RE for PUSCH in one PRB, based on the number of symbol for the PUSCH that is larger than the predetermined number of symbols, identify a number of RE for the PUSCH in allocated PRBs, based on the number of RE for PUSCH in one PRB, identify TBS for the PUSCH based on the number of RE for PUSCH in allocated PRBs, and receive the PUSCH from a terminal based on the TBS.

A method for configuring a time resource of an uplink channel appropriate for a transmission environment by a base station or a UE proposed in the disclosure is advantageous in that the uplink channel may be transmitted by using various time resources, thereby improving the uplink channel reception performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating demodulation reference signal (DMRS) patterns (type 1 and type 2) used for communication between a base station and a user equipment (UE) in a 5G system according to an embodiment of the disclosure;

Throughout the drawings, it should be noted that like reference numbers are used to depict the same or similar elements, features, and structures.

DETAILED DESCRIPTION

Figure 1:
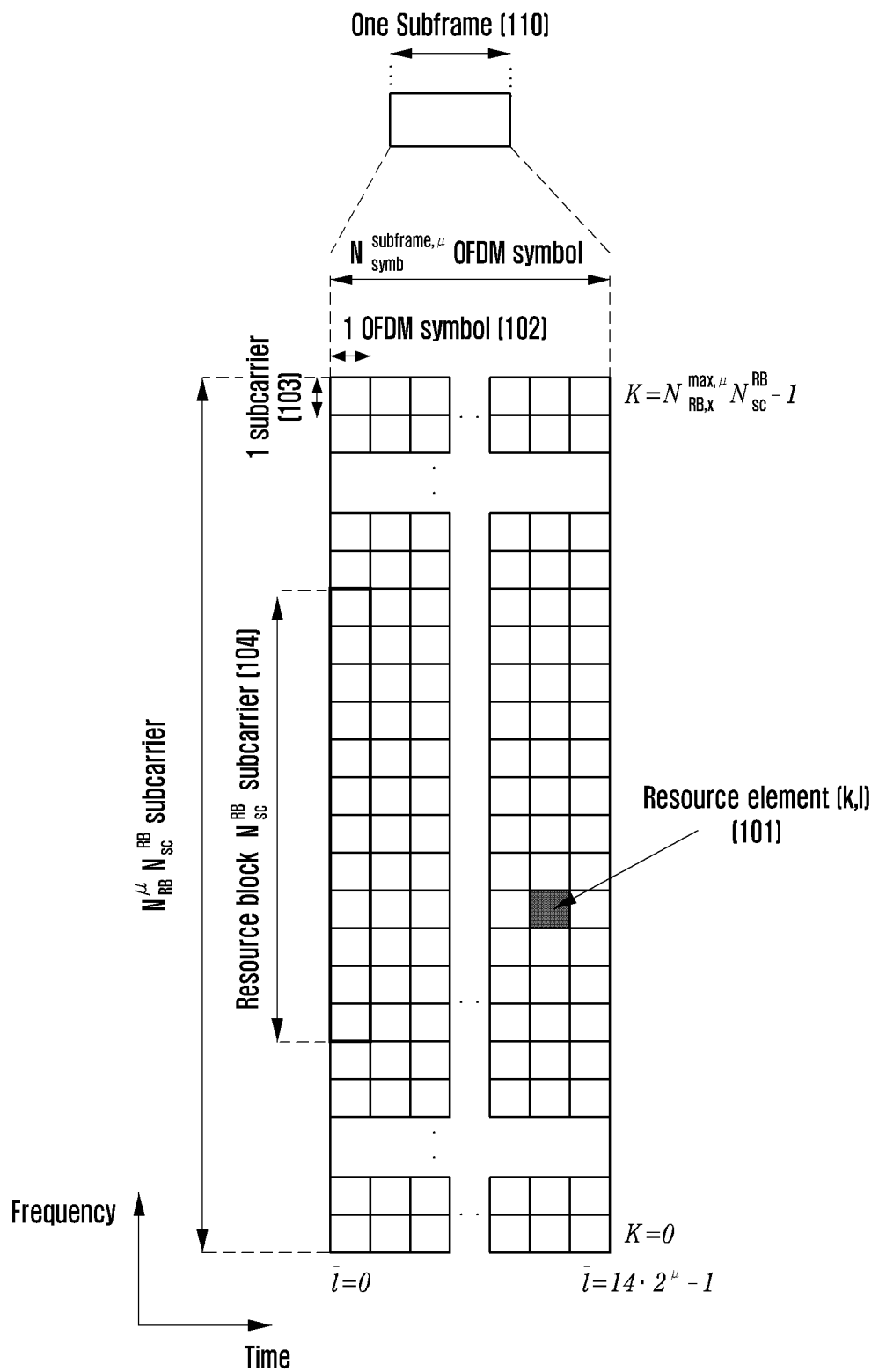
FIG. 1 is a diagram illustrating a basic structure of a time-frequency domain, which is a radio resource domain in which data or a control channel is transmitted in a 5th generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smrtphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, embodiments of the disclosure will be described with reference to the accompanying drawings. Hereinafter, although the method and apparatus proposed in the embodiment describes an embodiment as an example for PUSCH coverage improvement, it is not limited and applied to each embodiment of the disclosure, and it may be possible to use all or a combination of all or some embodiments of one or more embodiments suggested in the disclosure to a method for configuring a frequency resource corresponding to another channel.

Further, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards, such as IEEE's 802.16e.

In the LTE system, which is a representative example of a broadband wireless communication system, in downlink (DL), orthogonal frequency division multiplexing (OFDM) scheme is adopted, and in uplink (UL), single carrier frequency division multiple access (SC-FDMA) scheme is adopted. Uplink refers to a radio link in which a UE (user equipment (UE) or mobile station (MS)) transmits data or control signals to a base station (eNode B (eNB) or base station (BS)), and downlink refers to a radio link through which a base station transmits data or control signals to the UE. In addition, the above-described multiple access method allows the data or control information of each user to be distinguished by allocating and operating the time-frequency resources to which the data or control information for each user are to be transmitted do not overlap each other, that is, to establish orthogonality.

The 5G communication system, which is a communication system after LTE, must support services that simultaneously satisfy various requirements so that various requirements from users and service providers can be freely reflected. Services considered for the 5G communication system include enhanced mobile broadband (eMBB), massive machine-type communication (mMTC), and ultra-reliability low latency communication (URLLC).

The eMBB aims to provide more improved data transfer rates than those supported by existing LTE, LTE-A or LTE-Pro. For example, in the 5G communication system, the eMBB should be able to provide a peak data rate of 20 Gbps in the downlink and a peak data rate of 10 Gbps in the uplink from the viewpoint of one base station. In addition, the 5G communication system must provide the peak data rate and, at the same time, provide the increased user perceived data rate of the UE. In order to satisfy such a requirement, it may be required to improve various transmission/reception technologies, including a more advanced multi-antenna (multi-input multi-output, (MIMO)) transmission technology. In addition, in the LTE system, a signal is transmitted using a transmission bandwidth of up to 20 MHz in the 2 GHz band, whereas the 5G communication system can satisfy the data transmission rate required by the 5G communication system by using a frequency bandwidth wider than 20 MHz in a frequency band of 3 to 6 GHz or 6 GHz or more.

At the same time, the mMTC is being considered to support application services, such as the Internet of Thing (IoT) in the 5G communication system. In order to efficiently provide the Internet of Things, the mMTC requires access support for large-scale UEs within a cell, improvement of coverage of UEs, improved battery life, and reduction of costs of UEs. Because the Internet of Things is attached to various sensors and various devices to provide communication functions, it must be able to support a large number of UEs (e.g., 1,000,000 UEs/km2) within a cell. In addition, because a UE supporting the mMTC is highly likely to be located in a shaded area that a cell cannot cover, such as the basement of a building, due to the nature of the service, it requires wider coverage compared to other services provided by the 5G communication system. A UE supporting the mMTC must be including a low-cost UE, and because it is difficult to frequently exchange the battery of the UE, a very long battery life time, such as 10 to 15 years is required.

Lastly, in the case of URLLC, it is a cellular-based wireless communication service used mission-critically. For example, services used for remote control of robots or machinery, industrial automation, unmanned aerial vehicles, remote health care, emergency alerts, or the like, may be considered. Therefore, the communication provided by URLLC must provide very low latency and very high reliability. For example, a service supporting URLLC must satisfy the air interface latency of less than 0.5 milliseconds and, at the same time, must satisfy the requirement of a packet error rate of $10^{-5}$ or less. Therefore, for a service supporting URLLC, the 5G system must provide a transmit time interval (TTI) that is smaller than that of other services, and at the same time must allocate a wide resource in a frequency band to secure the reliability of the communication link.

The three services of the 5G communication system (hereinafter interchangeable with the 5G system), that is, the eMBB, URLLC, and mMTC, may be multiplexed and transmitted in one system. In this case, different transmission/reception techniques and transmission/reception parameters may be used between services to satisfy different requirements of each service.

Hereinafter, a frame structure of the 5G system will be described with reference to the drawings.

FIG. 1 is a diagram illustrating a basic structure of a time-frequency domain, which is a radio resource domain of a 5G system according to an embodiment of the disclosure.

Referring to FIG. 1, the horizontal axis represents the time domain, and the vertical axis represents the frequency domain. The basic unit of resources in the time and frequency domains is a resource element (RE) 101 and may be defined as one orthogonal frequency division multiplexing (OFDM) symbol (or discrete Fourier transform spread OFDM (DFT-s-OFDM) symbol) 102 on the time axis and one subcarrier 103 on the frequency axis. $N_{sc}^{RB}$ (e.g., 12) consecutive REs in the frequency domain may constitute one resource block (RB) 104. In addition, in the time domain, $N_{symb}^{subframe}$ consecutive OFDM symbols may constitute one subframe 110.

Figure 2:
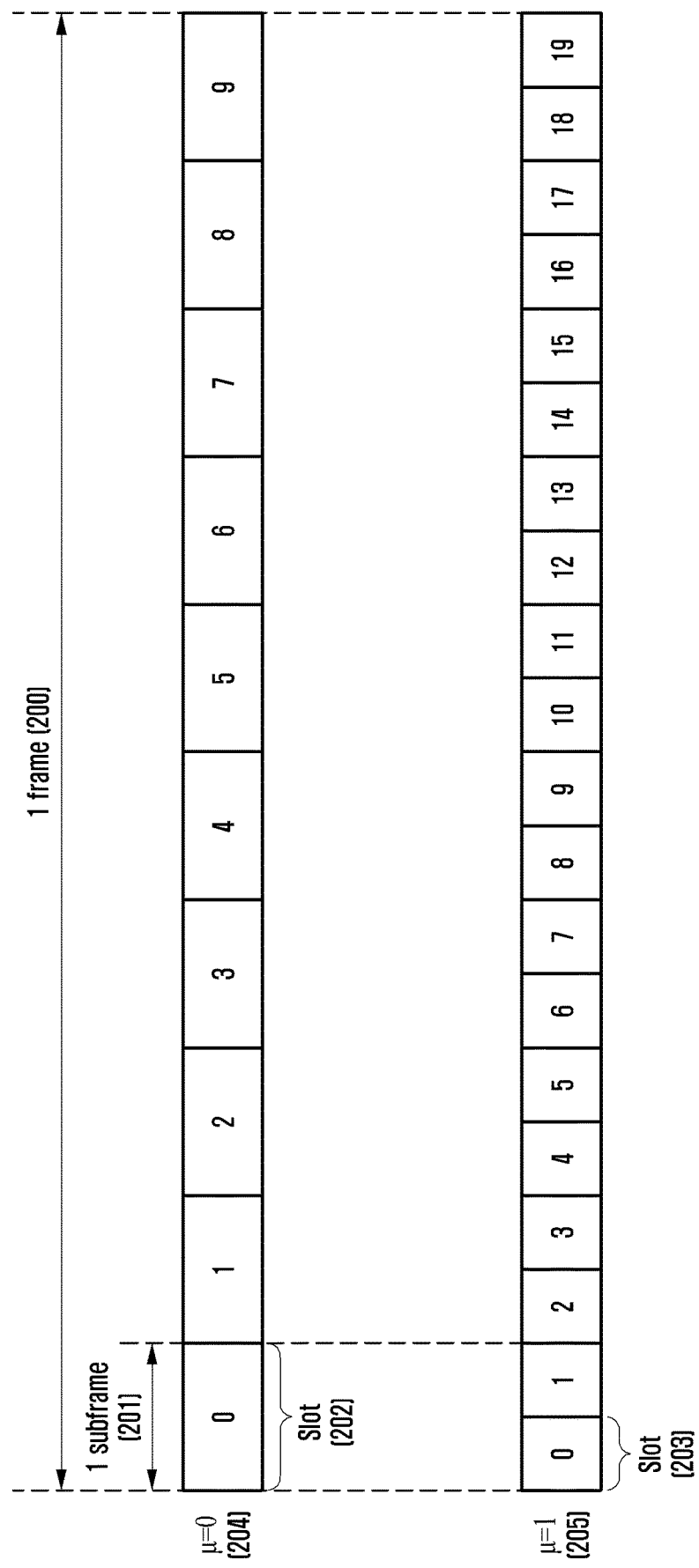
FIG. 2 is a diagram illustrating a slot structure considered in a 5G system according to an embodiment of the disclosure.

FIG. 2 is a diagram illustrating a slot structure considered in a 5G system according to an embodiment of the disclosure.

FIG. 2 illustrates an example of a structure of a frame 200, a subframe 201, and a slot 202. One frame 200 may be defined as 10 ms. One subframe 201 may be defined as 1 ms, and thus one frame 200 may be including a total of 10 subframes 201. In addition, one slot (202, 203) may be defined as 14 OFDM symbols (i.e., the number of symbols per slot $N_{symb}^{slot}=14$). One subframe 201 may consist of one or a plurality of slots 202 and 203, and the number of slots 202 and 203 per one subframe 201 may vary according to μ (204, 205), which is a configuration value for the subcarrier interval.

Referring to FIG. 2, the slot structure in the case where μ=0 (204) and μ=1 (205) is illustrated as the subcarrier interval configuration value. When μ=0, 204, one subframe 201 may consist of one slot 202, and when μ=1, 205, one subframe 201 may consist of two slots 203. For example, depending on the configuration value μ for the subcarrier interval, the number of slots per one subframe $N_{slot}^{subframe,\mu}$ may vary, and accordingly, the number of slots per one frame $N_{slot}^{frame,\mu}$ may vary. $N_{slot}^{subframe,\mu}$ and $N_{slot}^{frame,\mu}$ according to each subcarrier interval configuration μ may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a demodulation reference signal (DMRS), which is one of the reference signals in the 5G system, will be described.

The DMRS may consist of several DMRS ports, and each port maintains orthogonality so as not to cause interference with each other using code division multiplexing (CDM) or frequency division multiplexing (FDM). However, the term for DMRS may be expressed in other terms depending on the intention of the user and the purpose of using the reference signal. More specifically, the term DMRS is merely provided for specific examples in order to easily explain the technical content of the disclosure and to help the understanding of the disclosure, and is not intended to limit the scope of the disclosure. For example, it is apparent to those of ordinary skill in the art to which the disclosure pertains that it can be implemented even with a reference signal, based on the technical idea of the disclosure.

FIG. 3 is a diagram illustrating DMRS patterns (type1 and type2) used for communication between a base station and a UE in a 5G system according to an embodiment of the disclosure.

Referring to FIG. 3, in the 5G system, two DMRS patterns may be supported. Two DMRS patterns are specifically illustrated in FIG. 3. Referring to FIGS. 3, 301 and 302 indicate DMRS type1, where 301 indicates 1 symbol pattern and 302 indicates 2 symbol pattern. DMRS type1 of 301 and 302 of FIG. 3 is a DMRS pattern having a comb 2 structure, and may be including two CDM groups, and different CDM groups may be frequency division multiplexed.

In the 1 symbol pattern of 301 of FIG. 3, frequency CDM is applied to the same CDM group, so that 2 DMRS ports may be distinguished, and thus a total of 4 orthogonal DMRS ports may be configured. The DMRS port ID mapped to each CDM group is illustrated in 301 of FIG. 3 (in the case of downlink, the DMRS port ID is indicated by adding +1000 to the illustrated number). In the 2 symbol pattern of 302 of FIG. 3, time/frequency CDM is applied to the same CDM group, so that 4 DMRS ports may be distinguished, and thus a total of 8 orthogonal DMRS ports may be configured. The DMRS port ID mapped to each CDM group is illustrated in 302 of FIG. 3 (in the case of downlink, the DMRS port ID is indicated by adding +1000 to the illustrated number).

DMRS type2 of 303 and 304 of FIG. 3 is a DMRS pattern having a structure in which frequency domain orthogonal cover codes (FD-OCC) is applied to subcarriers adjacent in frequency, and may be including three CDM groups, and different CDM groups may be frequency division multiplexed.

In the 1 symbol pattern of 303 of FIG. 3, frequency CDM is applied to the same CDM group, so that 2 DMRS ports may be distinguished, and thus a total of 6 orthogonal DMRS ports may be configured. The DMRS port ID mapped to each CDM group is illustrated in 303 of FIG. 3 (in the case of downlink, DMRS port ID is indicated by adding +1000 to the illustrated number). In the 2 symbol pattern of 304 of FIG. 3, time/frequency CDM is applied to the same CDM group, so that 4 DMRS ports may be distinguished, and thus a total of 12 orthogonal DMRS ports may be configured. The DMRS port ID mapped to each CDM group is illustrated in 304 of FIG. 3 (in the case of downlink, the DMRS port ID is indicated by adding +1000 to the illustrated number).

As described above, in the NR system, two different DMRS patterns (301, 302 or 303, 304 in FIG. 3) may be configured, and whether the DMRS pattern is one symbol pattern, 301 and 303, or two adjacent symbol patterns, 302 and 304, may also be configured. In addition, in the NR system, not only a DMRS port number is scheduled, but also the number of CDM groups scheduled together for PDSCH rate matching may be configured and signaled. In addition, in the case of the cyclic prefix based orthogonal frequency division multiplex (CP-OFDM), both DMRS patterns described above in DL and UL may be supported, and in case of the discrete Fourier transform spread OFDM (DFT-S-OFDM), only DMRS type 1 among the DMRS patterns described above in UL may be supported. In addition, additional DMRS may be supported to be configurable. The front-loaded DMRS refers to the first DMRS appearing in the first symbol in time, and the additional DMRS refers to the DMRS appearing in the symbol after the front-loaded DMRS. The number of additional DMRSs in the NR system may be configured from a minimum of 0 to a maximum of 3. In addition, when the additional DMRS is configured, the same pattern as the front-loaded DMRS may be assumed. More specifically, if information on whether the DMRS pattern type described above for the front-loaded DMRS is type 1 or type2, information on whether the DMRS pattern is a one symbol pattern or an adjacent two symbol pattern, and information on the number of CDM groups used with the DMRS port are indicated, when additional DMRS is additionally configured, it may be assumed that the same DMRS information as the front-loaded DMRS is configured for the additional DMRS.

More specifically, the downlink DMRS and uplink DMRS configurations described above may be configured through RRC signaling in Tables 2 and 3 below.

TABLE 2

```
DMRS-DownlinkConfig ::=                    SEQUENCE {
    dmrs-Type (DMRS type configuration)        ENUMERATED
                                                 {type2}
OPTIONAL, -- Need S
    dmrs-AdditionalPosition (Additional DMRS OFDM symbol
    configuration)
ENUMERATED {pos0, pos1, pos3}              OPTIONAL, -- Need S
    maxLength (1 symbol or 2symbol DMRS pattern related
    configuration)
ENUMERATED {len2} OPTIONAL, -- Need S
        scramblingID0 (scrambling ID0)         INTEGER (0..65535)
        OPTIONAL, -- Need S
        scramblingID1 (scrambling ID1)         INTEGER (0..65535)
OPTIONAL, -- Need S
        phaseTrackingRS (PTRS configuration)   SetupRelease { PTRS-
DownlinkConfig } OPTIONAL, -- Need M
    ...
}
```

TABLE 3

```
DMRS-UplinkConfig ::=                    SEQUENCE {
    dmrs-Type (DMRS type configuration)           ENUMERATED {type2}
OPTIONAL, -- Need S
    dmrs-AdditionalPosition (Additional DMRS OFDM symbol configuration)
ENUMERATED {pos0, pos1, pos3}                     OPTIONAL, -- Need R
    phaseTrackingRS (PTRS configuration)          SetupRelease { PTRS-
UplinkConfig }                       OPTIONAL, -- Need M
    maxLength (1 symbol or 2symbol DMRS pattern related configuration)
ENUMERATED {len2}                                 OPTIONAL, -- Need S
    transformPrecodingDisabled           SEQUENCE {
        scramblingID0 (scrambling ID0)            INTEGER (0..65535)
OPTIONAL, -- Need S
        scramblingID1 (scrambling ID0)            INTEGER (0..65535)
OPTIONAL, -- Need S
        ...
    }                                             OPTIONAL, -- Need R
    transformPrecodingEnabled            SEQUENCE {
        nPUSCH-Identity (cell ID for DFT-s-OFDM)  INTEGER(0..1007)
OPTIONAL, -- Need S
        sequenceGroupHopping (sequence group hopping)   ENUMERATED
{disabled} OPTIONAL, -- Need S
        sequenceHopping (sequence hopping)        ENUMERATED {enabled}
OPTIONAL, -- Need S
        ...
    }                                             OPTIONAL, -- Need R
    ...
}
```

Figure 4:
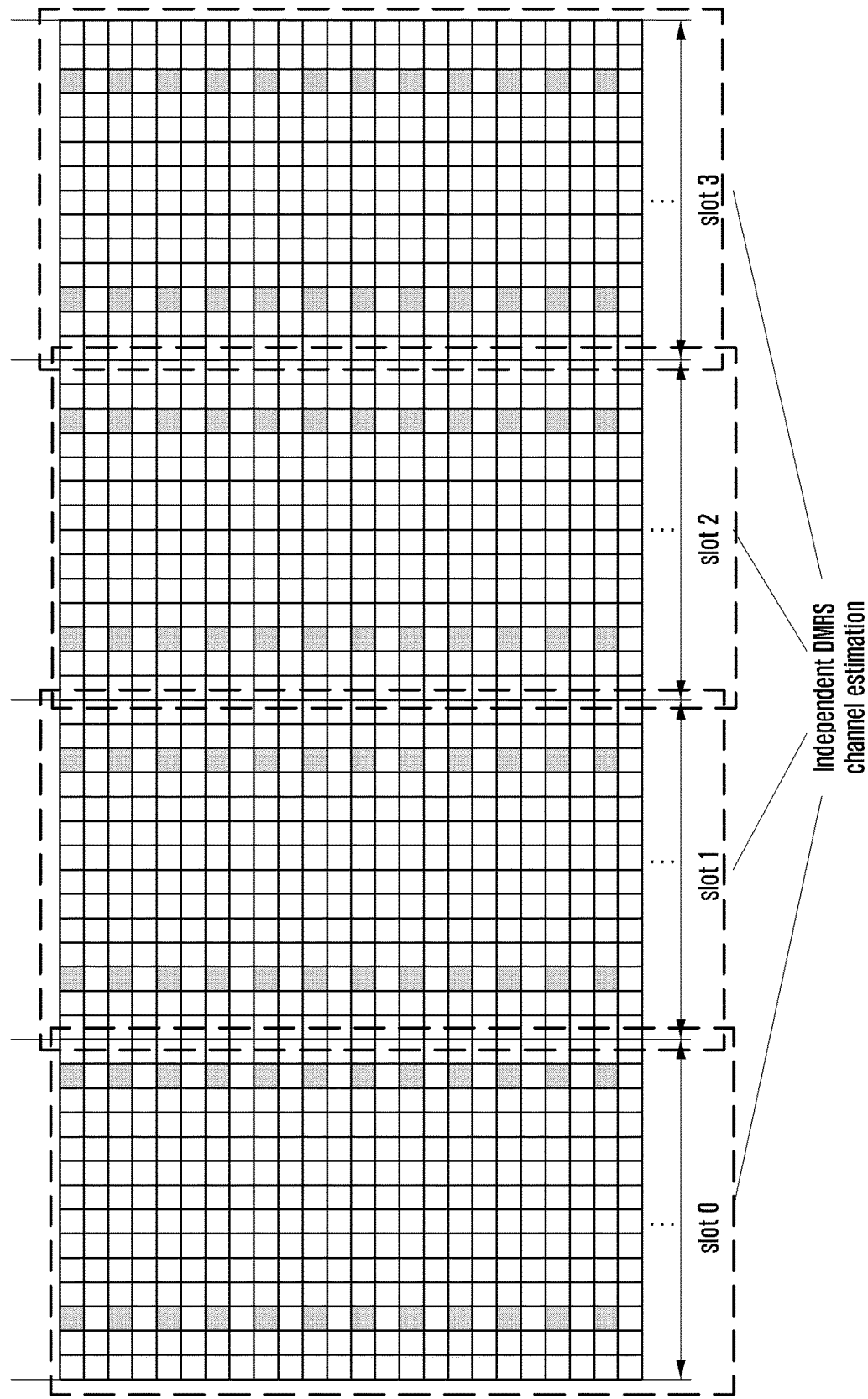
FIG. 4 is a diagram illustrating a channel estimation using DMRS received in one physical uplink shared channel (PUSCH) in a time band in a 5G system according to an embodiment of the disclosure.

FIG. 4 is a diagram illustrating a channel estimation using a DMRS received in one PUSCH in a time band in a 5G system according to an embodiment of the disclosure.

Referring to FIG. 4, in performing channel estimation for data decoding using the above-described DMRS, channel estimation may be performed in a precoding resource block group (PRG), which is a corresponding bundling unit, using PRB bundling linked to a system band in a frequency band. In addition, in a time unit, it is assumed that precoding is the same only for DMRSs received in one PUSCH, and the channel is estimated.

The base station may configure a table for time domain resource allocation information for a physical downlink shared channel (PDSCH) and a physical uplink shared channel (PUSCH) to the UE as higher layer signaling (e.g., RRC signaling).

The base station may configure a table consisting of maxNrofDL-Allocations=16 entries for PDSCH, and may configure a table consisting of maxNrofUL-Allocations=16 entries for PUSCH. The time domain resource allocation information may include, for example, PDCCH-to-PDSCH slot timing (corresponding to the time interval in slot units between the time when the PDCCH is received and the time when the PDSCH scheduled by the received PDCCH is transmitted, denoted by K0) or PDCCH-to-PUSCH slot timing (corresponding to the time interval in slot units between the time when the PDCCH is received and the time when the PUSCH scheduled by the received PDCCH is transmitted, denoted by K2), information on the position and length of a start symbol in which a PDSCH or PUSCH is scheduled within a slot, a mapping type of PDSCH or PUSCH, or the like. For example, information, such as the table below may be notified from the base station to the UE.

TABLE 4

```
PDSCH-TimeDomainResourceAllocationList information element
PDSCH-TimeDomainResourceAllocationList ::= SEQUENCE
(SIZE(1..maxNrofDL-Allocations)) OF
PDSCH-TimeDomainResourceAllocation
PDSCH-TimeDomainResourceAllocation ::=    SEQUENCE {
    k0                           INTEGER(0..32)
OPTIONAL, -- Need S
    (PDCCH-to-PDSCH timing, slot unit)
    mappingType                  ENUMERATED {typeA, typeB},
    (PDSCH mapping type)
    startSymbolAndLength         INTEGER (0..127)
    (start symbol and length of PDSCH)
}
```

TABLE 5

```
PUSCH-TimeDomainResourceAllocation information element
PUSCH-TimeDomainResourceAllocationList ::=              SEQUENCE
(SIZE(1..maxNrofUL-Allocations)) OF PUSCH-
TimeDomainResourceAllocation
PUSCH-TimeDomainResourceAllocation ::=    SEQUENCE {
    k2                       INTEGER(0..32)    OPTIONAL, -- Need S
    (PDCCH-to-PUSCH timing, slot unit)
    mappingType              ENUMERATED {typeA, typeB},
    (PUSCH mapping type)
    startSymbolAndLength     INTEGER (0..127)
    (start symbol and length of PUSCH)
}
```

The base station may notify the UE of one of the entries in the table for the time domain resource allocation information through L1 signaling (e.g., DCI) (for example, it may be indicated by the 'Time Domain Resource Allocation' field in DCI). The UE may acquire time domain resource allocation information for the PDSCH or PUSCH, based on the DCI received from the base station.

Hereinafter, repeated transmission of a physical uplink shared channel (PUSCH) in the 5G system will be described.

In the 5G system, two types of repetitive transmission methods of the physical uplink shared channel are supported as repetitive transmission type A and PUSCH repetitive transmission type B.

PUSCH Repeated Transmission Type a
  As described above, the start symbol and length of the physical uplink shared channel are determined by the time domain resource allocation method in one slot, and the base station may notify the UE of the number of repetitions through higher layer signaling (e.g., RRC signaling) or L1 signaling (e.g., DCI).
  Based on the number of repeated transmissions received from the base station, the UE repeatedly transmits the physical uplink shared channel having the same start symbol and length as the physical uplink shared channel configured above in consecutive slots. In this case, when at least one or more of a slot configured by the base station as a downlink to the UE or a configured physical uplink shared channel symbol is configured as a downlink, the UE may omit the physical uplink shared channel transmission. For example, although included in the number of repeated transmissions of the physical uplink shared channel, the UE may not perform transmission.

PUSCH Repeated Transmission Type B
  As described above, the start symbol and length of the physical uplink shared channel are determined by the time domain resource allocation method in one slot, and the base station may notify the UE of the number of repetitions numberofrepetitions through higher layer signaling (e.g., RRC signaling) or L1 signaling (e.g., DCI).
  First, based on the start symbol and length of the physical uplink shared channel configured above, the nominal repetition of the physical uplink shared channel is determined as follows. Here, nominal repetition refers to a resource of a symbol configured by the base station for PUSCH repeated transmission, and the UE determines a resource usable for uplink in the configured nominal repetition. In this case, the slot at which the nth nominal repetition starts is given by $$K_s + \left\lfloor \frac{S + n \cdot L}{N_{symb}^{slot}} \right\rfloor,$$

and the symbol at which the nominal repetition starts in the starting slot is given by $\mod(S+n \cdot L, N_{symb}^{slot})$. The slot where the nth nominal repetition ends is given by, and the symbol at which the nominal repetition ends in the last slot is given by $$K_s + \left\lfloor \frac{S + (n+1) \cdot L - 1}{N_{symb}^{slot}} \right\rfloor,$$

The slot where the nth nominal repetition ends is given by $$K_s + \left\lfloor \frac{S + (n+1) \cdot L - 1}{N_{symb}^{slot}} \right\rfloor,$$

and the symbol at which the nominal repetition ends in the last slot is given by $\mod(S+(n+1) \cdot L - 1, N_{symb}^{slot})$ where n=0, ..., numberofrepetitions-1, S denotes a start symbol of a configured physical uplink shared channel, and L denotes a symbol length of a configured physical uplink shared channel $K_s$ denotes a slot in which PUSCH transmission starts, and $N_{symb}^{slot}$ denotes the number of symbols per slot.

The UE determines an invalid symbol for PUSCH repeated transmission type B. A symbol configured for downlink by tdd-UL-DL-ConfigurationCommon or tdd-UL-DL-ConfigurationDedicated may be determined as an invalid symbol for PUSCH repeated transmission type B. Additionally, an invalid symbol may be configured based on a higher layer parameter (e.g., InvalidSymbolPattern). As an example, an invalid symbol may be configured by providing a symbol-level bitmap spanning one slot or two slots by the higher layer parameter (e.g., InvalidSymbolPattern). In the bitmap, 1 may represent an invalid symbol. Additionally, the period and pattern of the bitmap may be configured through a higher layer parameter (e.g., periodicityAndPattern). If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter indicates 1, the UE applies the invalid symbol pattern, and indicates 0, the invalid symbol pattern may not be applied. If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE may apply an invalid symbol pattern.

After the invalid symbol is determined in each nominal repetition, the UE may consider symbols other than the determined invalid symbol as valid symbols. If more than one valid symbol is included in each nominal repetition, the nominal repetition may contain one or more actual repetitions. Here, each actual repetition refers to a symbol actually used for PUSCH repeated transmission among the symbols configured as the configured nominal repetition, and may include a continuous configuration of valid symbols that can be used for PUSCH repeated transmission type B in one slot.

Figure 5:
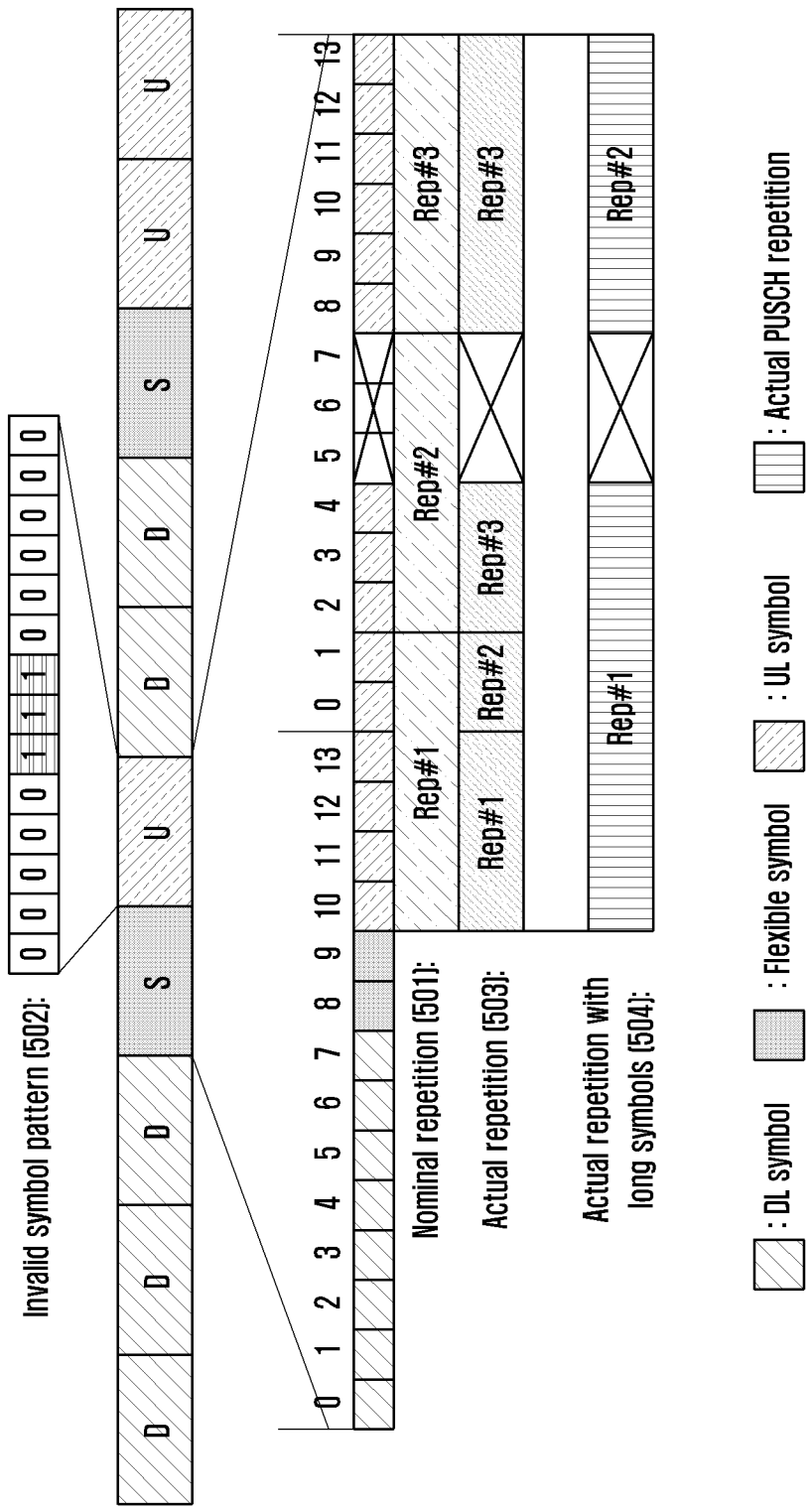
FIG. 5 is a diagram illustrating a PUSCH repeated transmission type B in a 5G system according to an embodiment of the disclosure.

FIG. 5 is a diagram illustrating a PUSCH repeated transmission type B in a 5G system according to an embodiment of the disclosure.

Referring to FIG. 5, when the UE receives the start symbol S of the physical uplink shared channel configured to 10, the length L is configured to 6, and the number of repeated transmissions is configured to 3, nominal repetition may appear in 3 consecutive slots 501. In order to determine the invalid symbol, the UE may determine the symbol configured as the downlink symbol in each nominal repetition as the invalid symbol, and determine the symbols configured to 1 in the invalid symbol pattern 502 as the invalid symbol. In each nominal repetition, when valid symbols other than invalid symbols consist of one or more consecutive symbols in one slot, the UE may configure actual repetition consisting of one or more consecutive symbols in the one slot 503. For the improvement of PUSCH repetition transmission type B, one or more consecutive actual repetitions may be configured as one actual repetition and transmitted 504.

Figure 6:
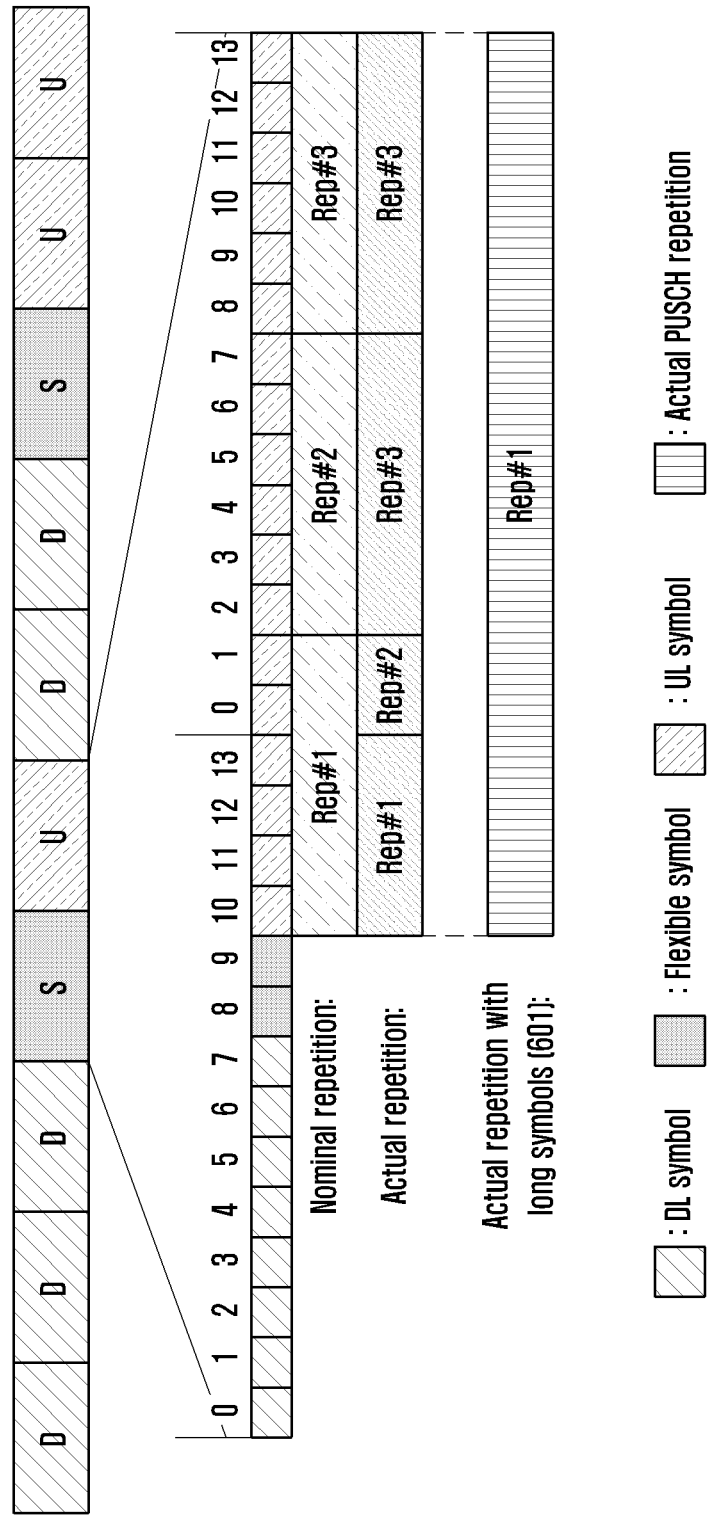
FIG. 6 is a diagram illustrating a PUSCH repeated transmission type B having 14 or more long symbols in a 5G system according to an embodiment of the disclosure.

FIG. 6 is a diagram illustrating a PUSCH repeated transmission type B having 14 or more long symbols in a 5G system according to an embodiment of the disclosure.

Referring to FIG. 6, if the PUSCH repeated transmission type B is configured in the UE and the nominal repetition configured for the PUSCH repeated transmission type B does not include an invalid symbol, continuous PUSCH repetition may be configured as one actual repetition. When the sum of the lengths of consecutive PUSCH repetitions is 14 symbols or more, actual repetitions having a long symbol length may be transmitted 601. By using actual repetition having a long symbol length, it is possible to reduce the number of repeated transmissions and obtain a coding gain to improve uplink coverage.

When the UE receives the PUSCH repeated transmission configuration through higher layer signaling or L1 signaling as in the above method, the UE may determine PUSCH transmission having a long symbol through the continuity of symbols configured for uplink. When valid symbols for uplink transmission are successively configured, the UE may perform PUSCH repeated transmission with long symbols by configuring the consecutively configured valid symbols as one symbol having a long symbol length and transmitting the PUSCH using this. In this case, the length of one symbol having a long symbol length may be configured to 14 symbols or more over several slots. On the contrary, when valid symbols for uplink transmission are branched into non-consecutive symbols, the UE may branch based on the non-consecutive symbols and perform repeated PSUCH transmission.

Hereinafter, a method of calculating a transport block size (TBS) in a 5G system will be described.

The number of REs allocated to PUSCH mapping in one PRB in the allocated resource, $N_{RE}'$ is calculated. The $N_{RE}'$ may be calculated as $N_{sc}^{RB} \times N_{symb}^{sh} - N_{DMRS}^{PRB} - N_{oh}^{PRB}$. Here, $N_{sc}^{RB}$ may be 12, and $N_{symb}^{sh}$ may indicate the number of OFDM symbols allocated to the PUSCH. $N_{DMRS}^{PRB}$ is the number of REs in one PRB occupied by DMRSs of the same CDM group. $N_{oh}^{PRB}$ is the number of REs occupied by an overhead in a PRB as long as it is configured by higher layer signaling, and may be configured to one of 0, 6, 12, and 18. Thereafter, $N_{RE}$, the total number of REs allocated to the PUSCH, may be calculated. $N_{RE}$ is calculated as min(156, $N_{RE}') \times n_{PRB}$, and $n_{PRB}$ indicates the number of PRBs allocated to the UE. The number of temporary information bits $N_{info}$ may be calculated as $N_{RE} \times R \times Q_m \times v$. Here, R is a code rate, $Q_m$ is a modulation order, and information on this value may be transmitted using an MCS bitfield of DCI and a pre-arranged table. In addition, v is the number of allocated layers. If $N_{info} \leq 3824$, TBS may be calculated through the following process. Otherwise, TBS may be calculated through operation 4. $N_{info}'$ may be calculated through the formulas of $$N_{info}' = \max\left(24, 2^n \times \left\lfloor \frac{N_{info}}{2^n} \right\rfloor\right)$$

and $n = \max(3, \lfloor \log_2(N_{info}) \rfloor - 6)$. TBS may be determined as a value closest to $N_{info}'$ among values not smaller than $N_{info}'$ in Table 6 below.

TABLE 6

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |

TABLE 6-continued

| Index | TBS |
| --- | --- |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info}>3824$, $N_{info}'$ may be calculated through the equations of $$N_{info}' = \max\left(3840, 2^n \times \text{round}\left(\frac{N_{info}-24}{2^n}\right)\right)$$

and $n = \lfloor \log\_2 \lfloor (N_{info}-24) \rfloor \rfloor - 5$. TBS may be determined through the value of $N_{info}'$ and the following [pseudo-code 1]. In the following, C corresponds to the number of code blocks that one TB contains.

[Start Pseudo-code 1]
if R ≤ 1/4

$$TBS = 8 * C * \left\lceil \frac{N_{info}'+24}{8*C} \right\rceil - 24, \text{ where } C = \left\lceil \frac{N_{info}'+24}{3816} \right\rceil$$

else
  if $N_{info}' > 8424$ $$TBS = 8 * C * \left\lceil \frac{N_{info}'+24}{8*C} \right\rceil - 24, \text{ where } C = \left\lceil \frac{N_{info}'+24}{8424} \right\rceil$$

else $$TBS = 8 * \left\lceil \frac{N_{info}'+24}{8} \right\rceil - 24$$

end if
end if
[End of Pseudo-code 1]

According to the disclosure, a TBS calculation method and a DMRS mapping method for the UE to repeatedly transmit a PUSCH having a length of 14 or more symbols will be described through embodiments.

This embodiment provides a method and apparatus for performing PUSCH repeated transmission having 14 or more long symbols in a 5G system. In addition, when performing PUSCH repeated transmission having 14 or more long symbols, a method for calculating TBS and a method and apparatus for mapping DMRS are provided. The PUSCH repeated transmission method having 14 or more long symbols, the method of calculating TBS, and the method of mapping DMRS according to an embodiment may be applied to improve uplink coverage through coding gain and precise channel estimation. In the following description of the embodiments of the disclosure, PUSCH repeated transmission having a long symbol length of 14 or more has been described as an example, but this is for illustrative purposes only, and does not limit the scope of the disclosure, and the embodiment according to the disclosure may also be applied to the case of PUSCH repeated transmission based on predefined/configured symbol/slot lengths greater than or equal to an arbitrary number of symbols/slot lengths that are predefined/configured or configured through signaling between a base station and a UE. In addition, a long symbol to be described hereinafter may be replaced with a symbol having a symbol/slot length greater than or equal to an arbitrary number of symbols/slot lengths defined/configured in advance or configurable through signaling between a base station and a UE may be applied. Hereinafter, each embodiment may be implemented independently of each other or in combination with one or more embodiments.

First Embodiment

The first embodiment provides a method and apparatus for calculating TBS when performing PUSCH repeated transmission having 14 or more long symbols. For TBS calculation in the 5G system, $N_{RE}'$, which is the number of REs allocated to PUSCH mapping in one PRB of allocated resources, is calculated. In the disclosure, PUSCH is mainly described for the sake of illustration, but this method may also be applied to PDSCH transmission.

$N_{RE}'$ may be calculated as $N_{sc}^{RB} \times N_{symb}^{sh} - N_{DMRS}^{PRB} - N_{oh}^{PRB}$. Here, $N_{sc}^{RB}$ is the number of subcarriers allocated for PUSCH repeated transmission. $N_{symb}^{sh}$ may indicate the total number of OFDM or SC-FDMA symbols allocated to the PUSCH, may be configured through higher layer signaling (e.g. RRC signaling) or L1 signaling (e.g., DCI format 0_1, DCI format 0_2 and DCI format 0_0), and may indicate the number of all symbols across several slots when the PUSCH is transmitted over several slots. $N_{DMRS}^{PRB}$ is the number of REs in the allocated resource area occupied by DMRSs of the same CDM group. $N_{oh}^{PRB}$ is the number of REs occupied by overhead in one PRB, and may be configured as xOverhead of higher layer signaling PUSCH-ServingCellConfig, for example, may be configured to one of 0, 6, 12, and 18. Thereafter, the UE may calculate the total number of REs allocated to the PUSCH, $N_{RE}$. $N_{RE}$ is calculated as $\min(156, N_{RE}') \times n_{PRB}$, and $n_{PRB}$ indicates the number of PRBs allocated to the UE. When performing PUSCH repeated transmission with a long symbol, the value of $N_{RE}'$ may be calculated based on $N_{symb}^{sh}>14$. When $N_{symb}^{sh}>14$, $N_{RE}$ may be determined using one of the following methods or a combination of one or more methods.

Method 1

When $N_{symb}^{sh}>14$, $N_{RE}$ may be calculated as $\min(N_{sc}^{RB} \times N_{symb}^{sh}, N_{RE}') \times n_{PRB}$ or $\min(N_{sc}^{RB} \times N_{symb}^{sh} - N_{DMRS}^{PRB}, N_{RE}') \times n_{PRB}$. Through the above scheme, PUSCH repeated transmission having a long symbol of $N_{symb}^{sh}>14$ may be possible. According to method 1, the UE may flexibly determine the value of $N_{RE}$ according to $N_{symb}^{sh}$ by using a formula for calculating the $N_{RE}'$.

Method 2

When $N_{symb}^{sh}>14$, $N_{RE}$ may be calculated as $$\min\left(156 \times \left\lceil \frac{N_{symb}^{sh}}{14} \right\rceil, N_{RE}'\right) \times n_{PRB}.$$

Through the above scheme, PUSCH repeated transmission having a long symbol of $N_{symb}^{sh}>14$ may be possible.

According to method 2, the UE may reuse the value of 156 by using the value of the quotient obtained by dividing $N_{symb}^{sh}$ by 14.

Method 3

When $N_{symb}^{sh}>14$, $N_{RE}$ may not be calculated as min(156, $N_{RE}'$)×$n_{PRB}$, but may be determined as $N_{RE}=N_{RE}'$. Through the above scheme, PUSCH repeated transmission with a long symbol $N_{symb}^{sh}>14$ may be possible. According to method 3, the complexity of the UE may be reduced.

Then, the TBS according to the $N_{info}$ value determined based on the N_RE calculated through the method described above, if $N_{info} \le 3824$, $N_{RE}$ may be determined through the value of $N_{info}'$ and Table 6, and if N_info>3824, $N_{RE}$ may be determined through the value of $N_{info}'$ and the [pseudo-code 1].

Second Embodiment

The second embodiment provides a DMRS mapping method and apparatus when performing PUSCH repeated transmission having 14 or more long symbols. Through the second embodiment, the DMRS may be mapped to the PUSCH having a long symbol.

In the case of PUSCH repetitive transmission type B, the number of symbols of actual repetition is not constant and is always configured to a front-loaded DMRS, so that the OFDM symbol position of the DMRS may be inefficiently arranged. Through the method of changing the position of the DMRS OFDM symbol in PUSCH transmission having a long symbol described in this embodiment, the channel estimation performance based on the same number of DMRS OFDM symbols may be improved, or it is possible to reduce DMRS overhead and improve transmission efficiency by reducing the number of DMRS OFDM symbols.

In the disclosure, a method of mapping a DMRS and a method of changing an OFDM symbol position of a DMRS based on the length of a PUSCH symbol in PUSCH repeated transmission may be determined using one of the following methods or a combination of one or more methods.

Method 1

In order to map the DMRS in the PUSCH having a long symbol, the UE may divide the duration of all symbols of the PUSCH using 14 reference symbols to map the DMRS to each interval. In this case, the PUSCH mapping type configured for higher layer signaling or L1 signaling may be applied as the PUSCH mapping method according to the symbol length of the divided PUSCH section.

Figure 7:
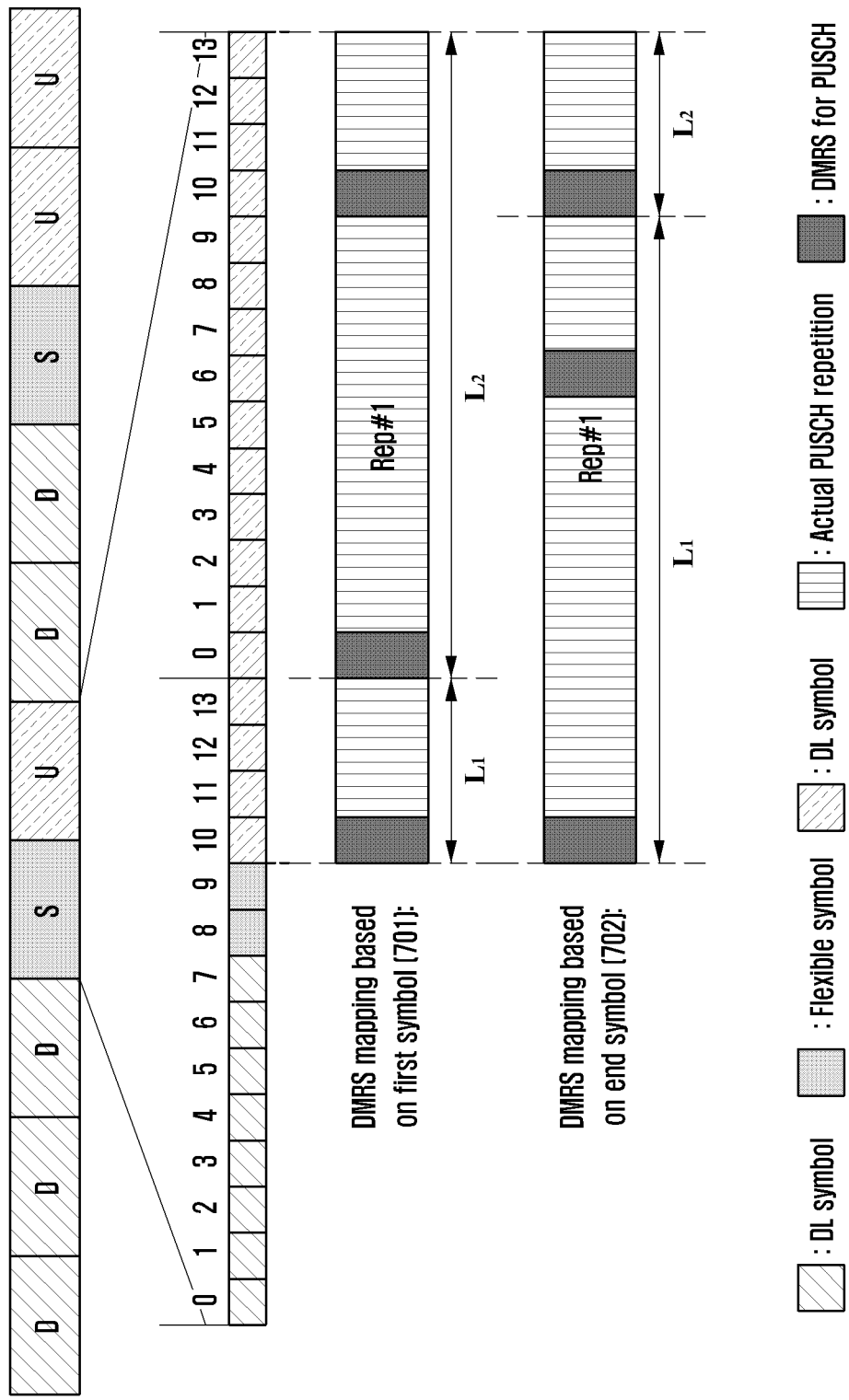
FIG. 7 is a diagram illustrating a DMRS location configuration method in PUSCH repeated transmission type B according to an embodiment of the disclosure.
Figure 8:
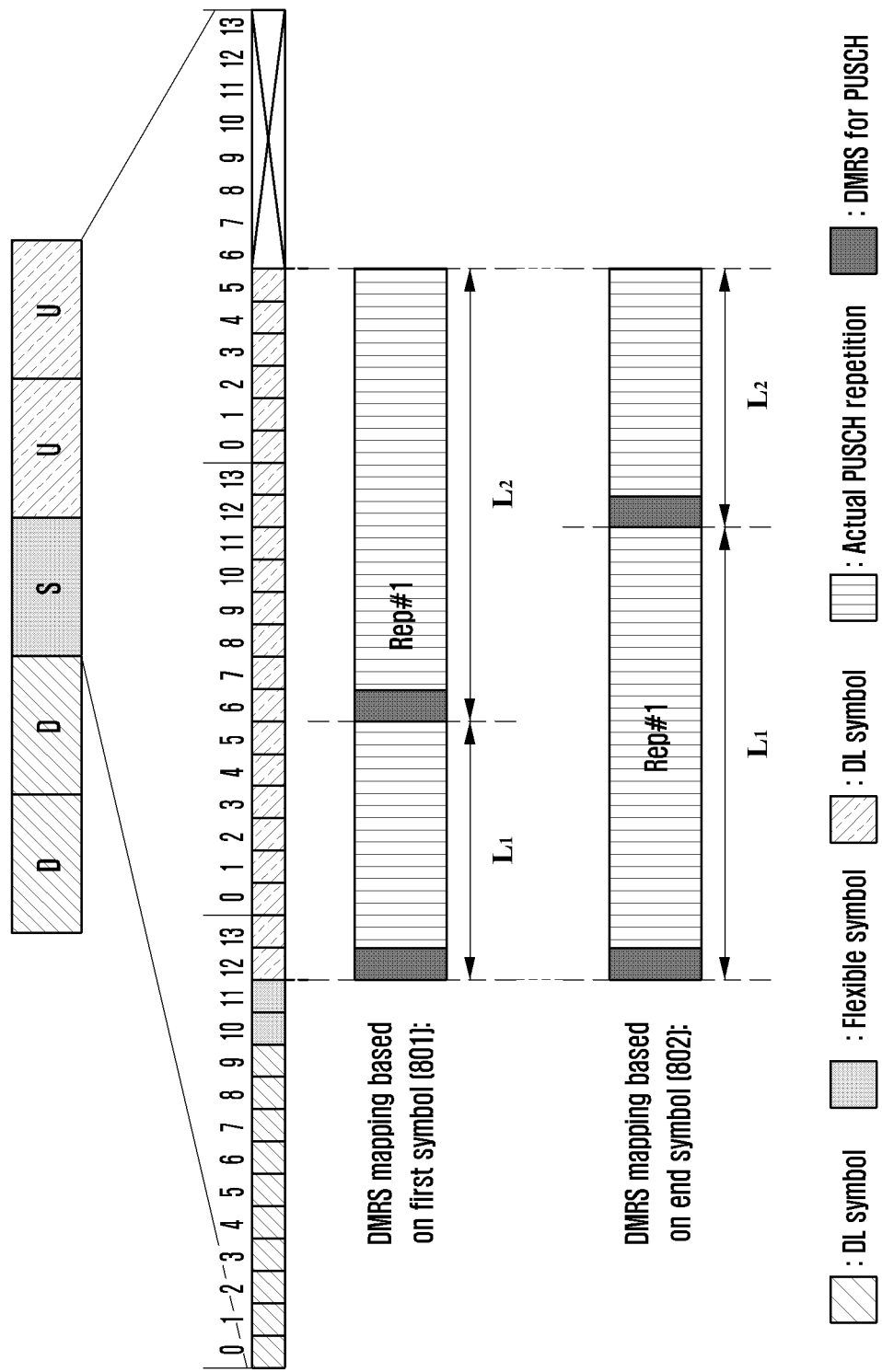
FIG. 8 is a diagram illustrating a DMRS location configuration method in PUSCH repeated transmission type B according to an embodiment of the disclosure.

FIGS. 7 and 8 are diagrams illustrating a DMRS location configuration method in PUSCH repeated transmission type B having a long symbol according to various embodiments of the disclosure.

Referring to FIGS. 7 and 8, FIG. 7 illustrates a method of dividing a PUSCH symbol interval into $L_1$ and $L_2$ and mapping DMRS, based on PUSCH mapping type B. When the TDD configuration of the UE is configured to DDDSU and the actual repetition symbol length of the PUSCH is configured to 18, the UE may configure $L_1$=mod(18, 14) and $L_2$=14, based on the first symbol of the PUSCH to position a short-length section in front of the PUSCH, and then map DMRS in each section (701). Alternatively, the UE may configured $L_1$=14, $L_2$=mod(18, 14) to map the DMRS in each section (702).

Referring to FIG. 8, when the TDD configuration of the UE is configured to DDSUU and the actual repetition symbol length of the PUSCH is configured to 22, the UE may configure $L_1$=mod(22, 14) and $L_2$=14, based on the first symbol of the PUSCH to position a short-length section in front of the PUSCH, and then map DMRS in each section (801). Alternatively, the UE may configure $L_1$=14, $L_2$=mod (22, 14) to map the DMRS in each section (802). Through this method, the DMRS may be mapped to the PUSCH having a long symbol. In the above method, the criterion for dividing the section may not be fixed to 14. In this case, the UE may perform DMRS mapping by receiving the length of a symbol for configuring a DMRS mapping interval through higher layer signaling or $L_1$ signaling.

Method 1-1

When mapping the DMRS to the PUSCH having a long symbol by the above method, a low density DMRS mapping method may be applied to reduce the overhead of the DMRS.

Figure 9:
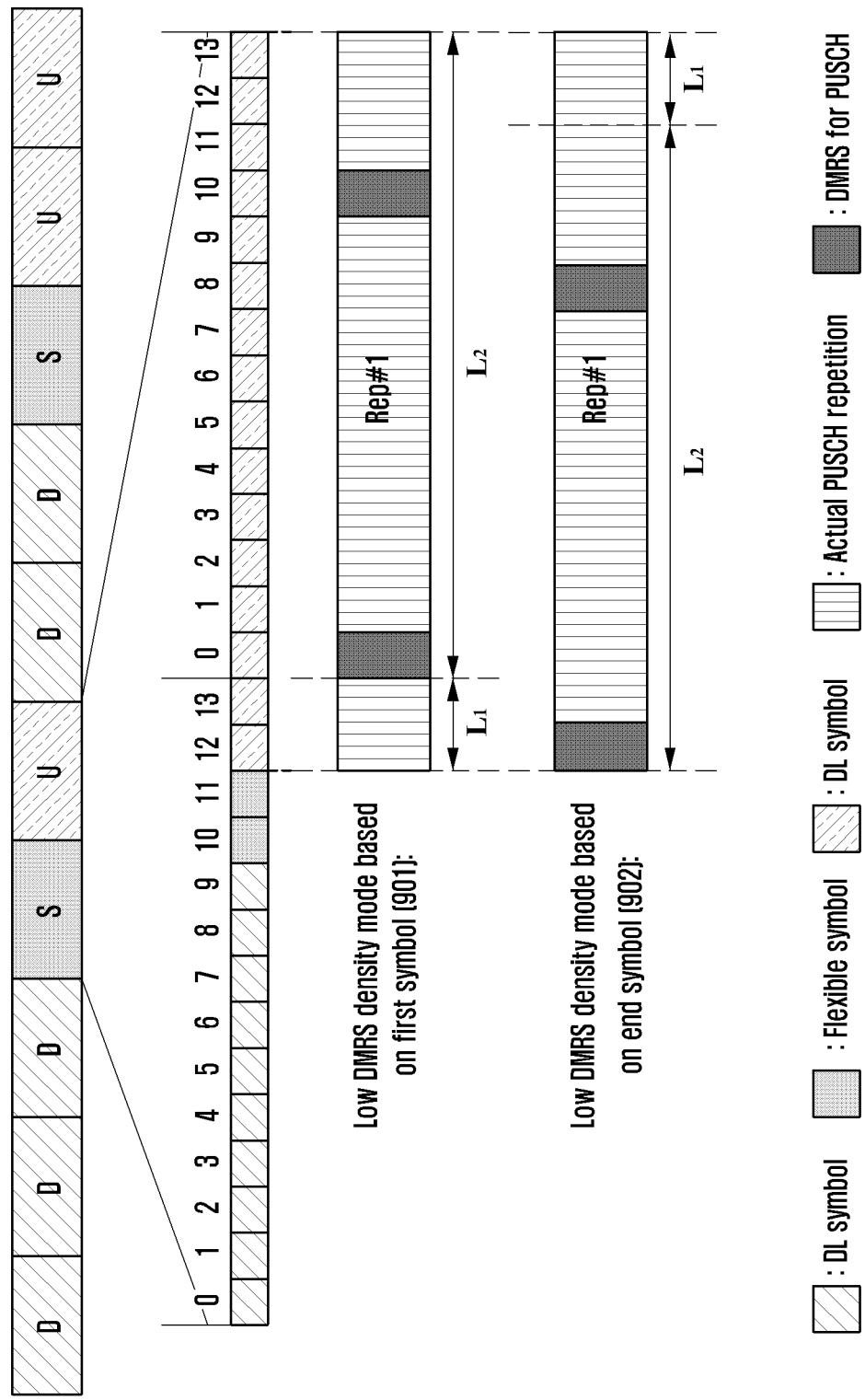
FIG. 9 is a diagram illustrating a DMRS location configuration method in PUSCH repeated transmission type B according to an embodiment of the disclosure.

FIG. 9 is a diagram illustrating a DMRS location configuration method in PUSCH repeated transmission type B according to an embodiment of the disclosure.

Referring to FIG. 9, it illustrates a method of omitting DMRS mapping for a short symbol period less than or equal to k by using a k value configured by higher layer signaling or $L_1$ signaling when a PUSCH symbol period is divided based on the reference symbol length (e.g., 14 symbols). As an example, when the UE receives the actual repetition symbol length of the PUSCH configured to 16, the interval may be divided by configuring $L_1$=mod(16,14) and $L_2$=14, based on the first symbol of the PUSCH. In this case, if $L_1 \le k$, the UE may omit DMRS mapping in the $L_1$ section (901). In addition, if the interval is divided by configuring $L_1$=14 and $L_2$=mod(16,14), if $L_2 \le k$, the UE may omit DMRS mapping in the $L_2$ interval (902). Through this, it is possible to reduce the overhead of DMRS and improve data transmission efficiency. The configuration value of k is the number of short symbols that can omit DMRS mapping. For example, k can be 1 or 2. The value of k is not limited to the value used in the above example, and may be configured through higher layer signaling or $L_1$ signaling of the base station.

Method 2

In order to map a DMRS in a PUSCH having a long symbol, the entire symbol of the PUSCH may be divided into sections using a slot boundary and each DMRS may be mapped. In this case, the method of mapping the DMRS to the above-described PUSCH may be applied according to the symbol length of the divided PUSCH section.

Figure 10:
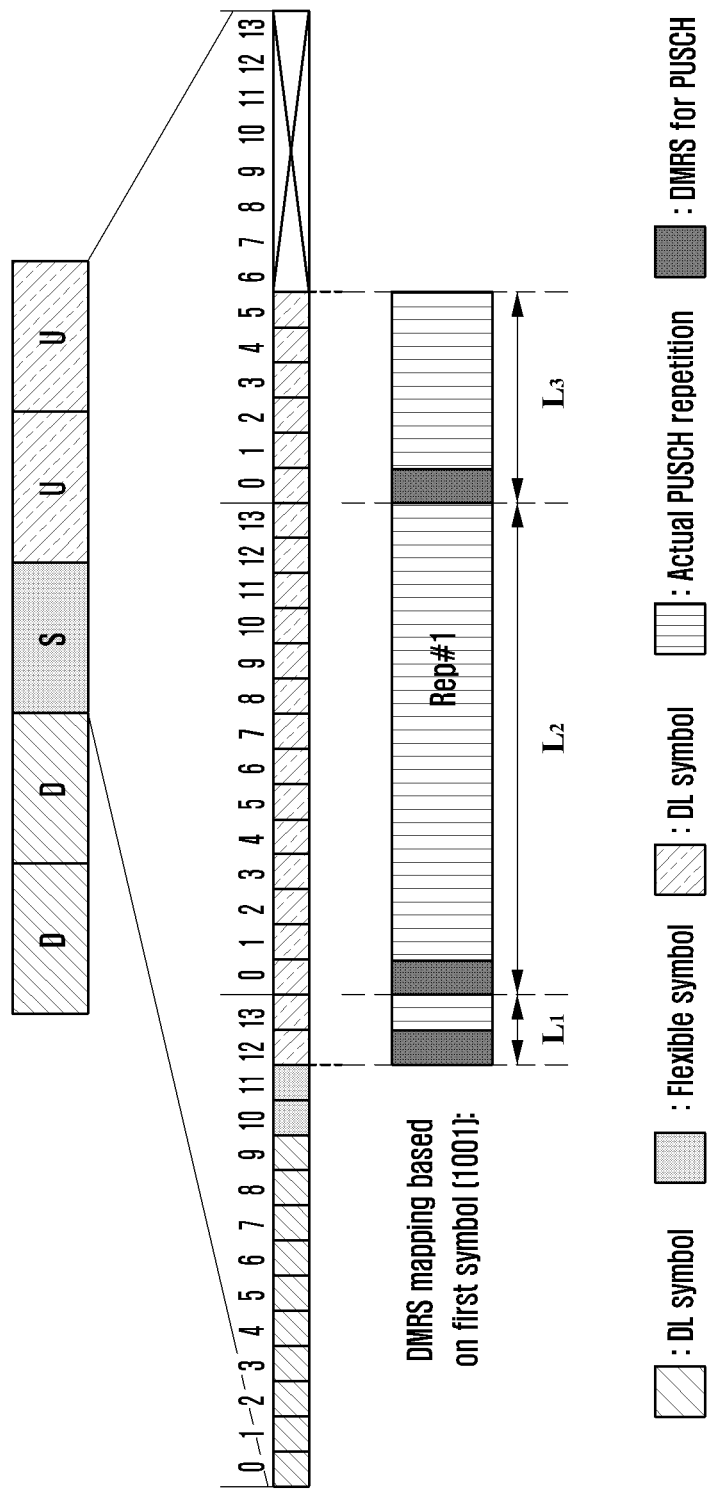
FIG. 10 is a diagram illustrating a DMRS location configuration method in PUSCH repeated transmission type B according to an embodiment of the disclosure.

FIG. 10 is a diagram illustrating a DMRS location configuration method in PUSCH repeated transmission type B having a long symbol according to an embodiment of the disclosure.

Referring to FIG. 10, when the TDD configuration of the UE is configured to DDSUU and the length of the PUSCH actual repetition symbol is configured to 22, the entire symbol of the PUSCH may be divided into sections $L_1$, $L_2$, and $L_3$. In the case of FIG. 10, $L_1$=2, $L_2$=14, $L_3$=6 and each may be DMRS mapped (1001), but this is only an example and does not limit the scope of the disclosure, and the number of sections and the length of each section may vary according to the start symbol, the last symbol, and the slot boundary of the PUSCH.

Method 2-1

When mapping the DMRS to the PUSCH having a long symbol in the above method, a low density DMRS mapping method may be applied to reduce the overhead of the DMRS.

Figure 11:
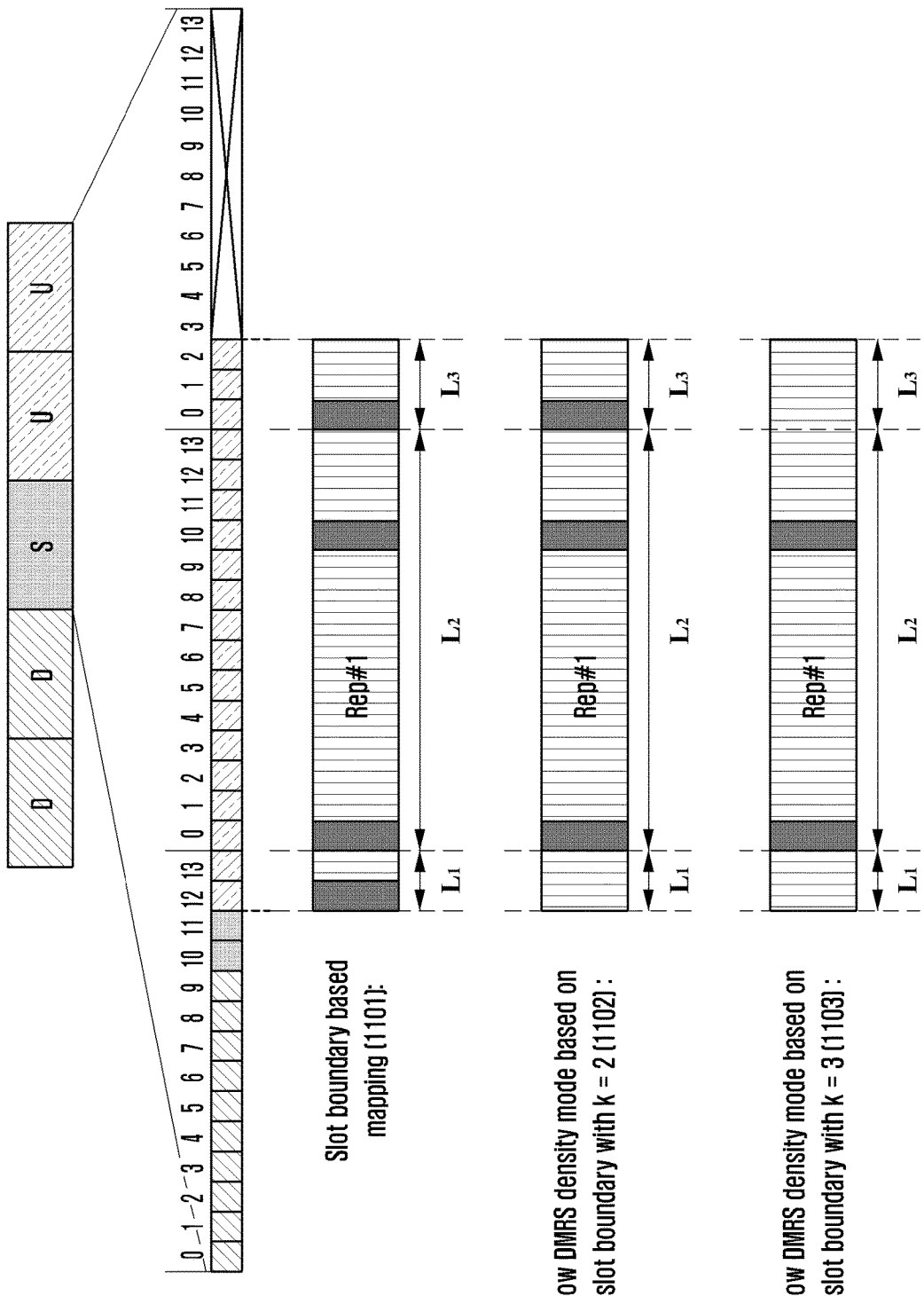
FIG. 11 is a diagram illustrating a DMRS location configuration method in PUSCH repeated transmission type B according to an embodiment of the disclosure.

FIG. 11 is a diagram illustrating a DMRS location configuration method in PUSCH repeated transmission type B according to an embodiment of the disclosure.

FIG. 11 illustrates a method of omitting DMRS mapping for a short symbol interval of k or less by using a value k configured through higher layer signaling or $L_1$ signaling when a PUSCH symbol interval is divided based on a slot boundary.

Referring to FIG. 11, when the UE receives the actual repetition symbol length of the PUSCH configured to 19, the interval may be divided by configuring $L_1$=2, $L_2$=14, and $L_3$=3, based on the first symbol of the PUSCH (1101). In this case, by comparing the symbol length of each of the $L_1$, $L_2$, and $L_3$ sections with the value of k, DMRS mapping may be omitted for a short symbol section of k or less. For example, if k is configured to 2 through higher layer signaling or $L_1$ signaling, because $L_1 \le k$, DMRS mapping of $L_1$ may be omitted (1102). In addition, if k is configured to 3 through higher layer signaling or $L_1$ signaling, because $L_1$ and $L_3 \le k$, DMRS mapping of $L_1$ and $L_3$ may be omitted (1103). Through the above method, it is possible to reduce the overhead of DMRS and improve data transmission efficiency. The configuration value of k is the number of short symbols that can omit DMRS mapping. For example, k can be 2 or 3. It is not limited to the value of k used in the above example, and may be configured through higher layer signaling or $L_1$ signaling of the base station.

Method 3

In the case of PUSCH mapping type A, the start symbol of the PUSCH is always fixed as the first symbol of the slot, and in the PUSCH mapping type B, the DMRS is always fixed as the first symbol of the PUSCH. In case of PUSCH repeated transmission type B, because the PUSCH may not be transmitted in the first symbol of the slot, when the PUSCH repeated transmission type B is applied, the PUSCH mapping type is always fixed to the PUSCH mapping type B, and the OFDM symbol position of the DMRS may be configured inefficiently.

To address this issue, a new PUSCH mapping type in which DMRS may not be allocated in the first symbol of PUSCH like PUSCH mapping type A and resources allocated to PUSCH like PUSCH mapping type B may be located anywhere in the slot may be configured. In the PUSCH mapping type A, when the constraint that the PUSCH symbol must be configured from the first symbol of the slot is removed, the restriction that the position of the DMRS must be determined based on the first symbol of the slot may also be removed. To this end, an OFDM symbol length for configuring a DMRS mapping interval is configured through higher layer signaling or $L_1$ layer signaling, and a PUSCH may be configured based on a new PUSCH mapping type that may be used in PUSCH repeated transmission type B.

Figure 12:
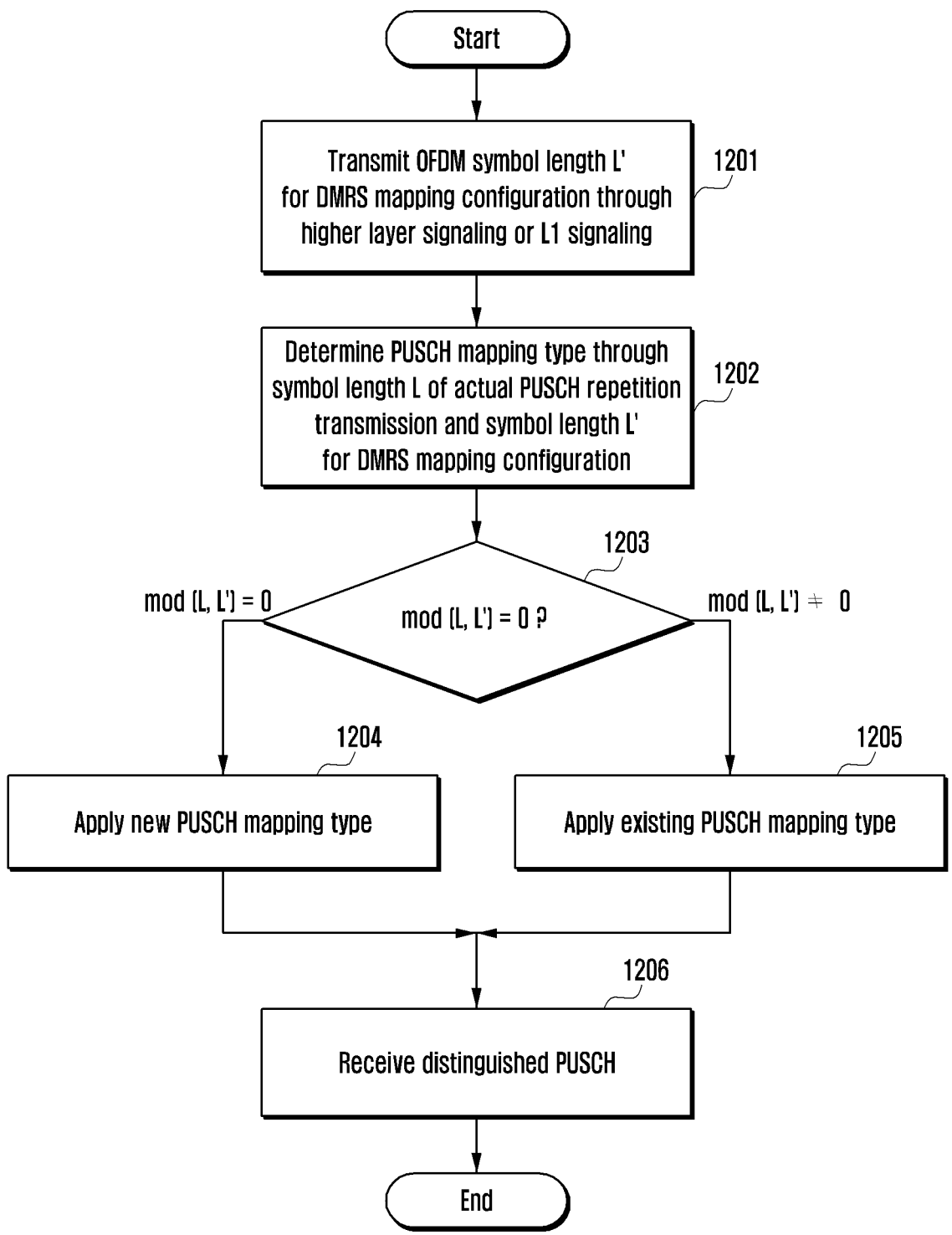
FIG. 12 is a flowchart illustrating an operation of a base station for configuring a PUSCH mapping type in actual PUSCH repeated transmission, according to an embodiment of the disclosure.

FIG. 12 is a flowchart illustrating an operation of a base station for receiving a PUSCH, based on a new PUSCH mapping type or an existing PUSCH mapping type B in repeated PUSCH transmission, according to an embodiment of the disclosure.

Referring to FIG. 12, the base station may transmit information on the OFDM symbol length L' for configuring the DMRS mapping section through higher layer signaling or $L_1$ signaling at operation 1201. Thereafter, the base station may determine the PUSCH mapping type by comparing the symbol length of the actual repetition to be transmitted with the OFDM symbol length configured for the DMRS section at operation 1202. In order to distinguish the PUSCH mapping type, the remainder obtained by dividing the symbol length L of the actual repetition by the OFDM symbol length L' for the DMRS interval configuration may be used at operation 1203. If mod(L,L')=0, a new PUSCH mapping type may be applied at operation 1204, and if mod(L, L')≠0, the existing PUSCH mapping type B may be applied at operation 1205. Thereafter, the base station may receive a PUSCH according to the applied PUSCH mapping type from the UE at operation 1206.

Figure 13:
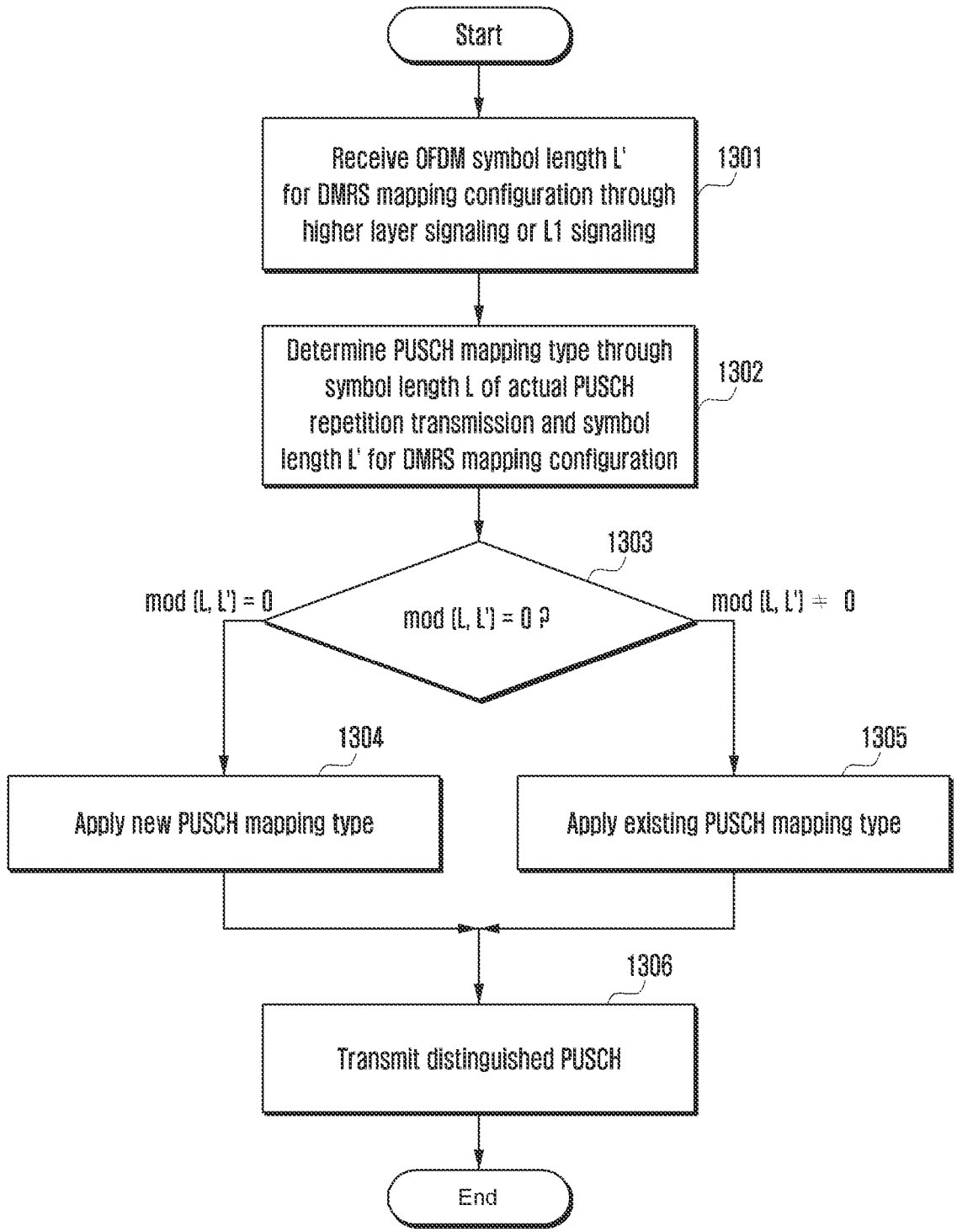
FIG. 13 is a flowchart illustrating an operation of a UE for configuring a PUSCH mapping type in actual PUSCH repeated transmission, according to an embodiment of the disclosure.

FIG. 13 is a flowchart illustrating an operation of a UE transmitting a PUSCH based on a new PUSCH mapping type or an existing PUSCH mapping type B in repeated PUSCH transmission, according to an embodiment of the disclosure.

Referring to FIG. 13, the UE may receive information on the OFDM symbol length L' for configuring the DMRS mapping interval through higher layer signaling or $L_1$ signaling at operation 1301. Thereafter, the UE may determine the PUSCH mapping type by comparing the symbol length of the actual repetition to be transmitted with the OFDM symbol length configured for the DMRS interval at operation 1302. In order to distinguish the PUSCH mapping type, the remainder obtained by dividing the symbol length L of the actual repetition by the OFDM symbol length L' for the DMRS interval configuration may be used at operation 1303. If mod(L, L')=0, a new PUSCH mapping type may be applied at operation 1304, and if mod(L, L')≠0, the existing PUSCH mapping type B may be applied at operation 1305. Thereafter, the UE may transmit a PUSCH according to the applied PUSCH mapping type to the base station at operation 1306. As in the above method, the UE may additionally receive an L' value for defining a new PUSCH mapping type through higher layer signaling or $L_1$ signaling. The value of L' may be considered for DMRS mapping configuration in the base station, and if the UE does not receive the L' value, the UE may use the existing PUSCH mapping type B.

Figure 14:
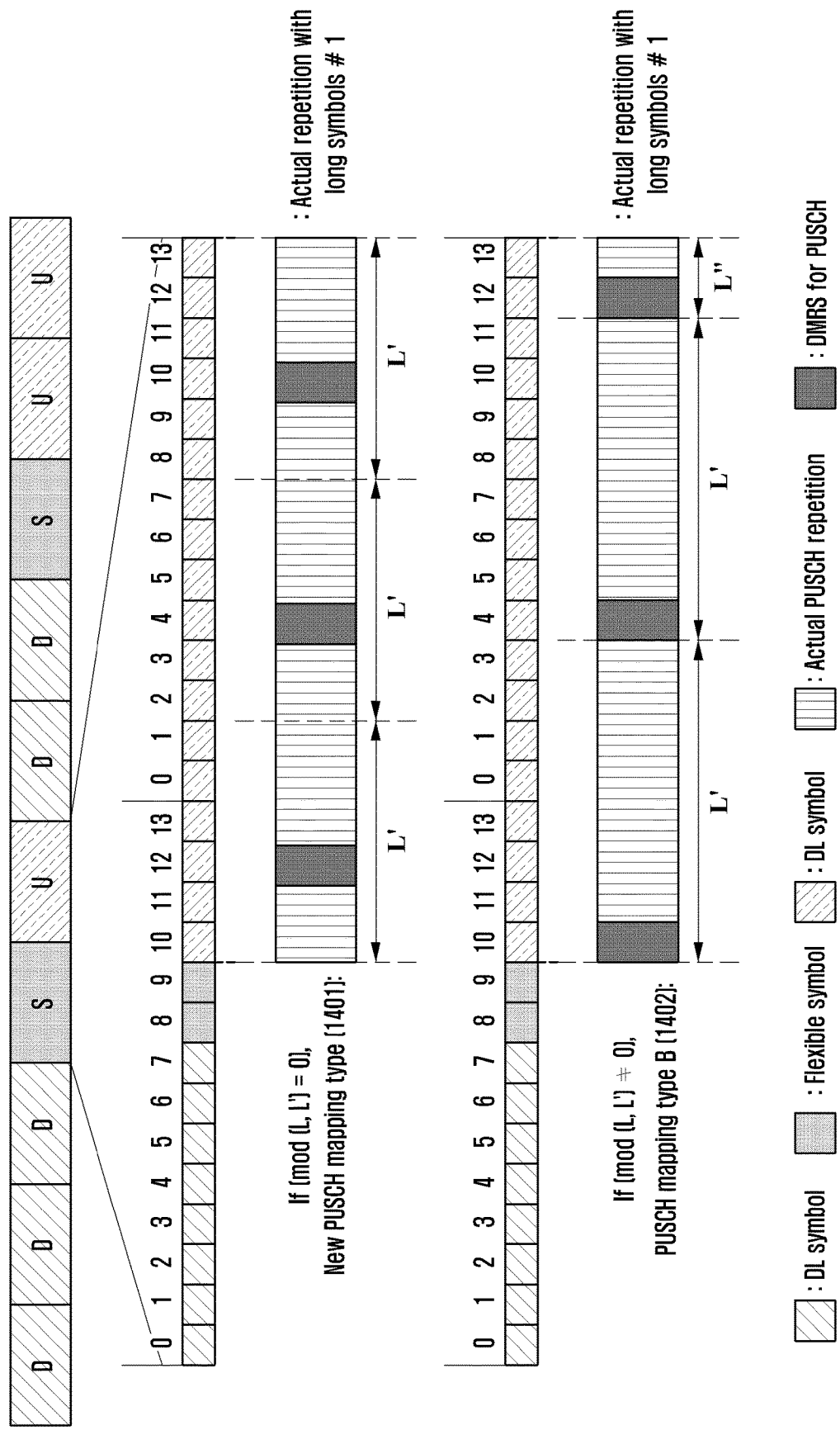
FIG. 14 is a diagram illustrating a DMRS location configuration method in PUSCH repeated transmission type B according to an embodiment of the disclosure.

FIG. 14 is a diagram illustrating a DMRS location configuration method in PUSCH repeated transmission type B according to an embodiment of the disclosure.

Referring to FIG. 14, when the length L of the actual repetition symbol of PUSCH is configured to 18 and the length L' of the symbol for configuring the DMRS mapping interval is configured to 6, if mod(L, L')=0, the DMRS may be efficiently located by applying the new PUSCH mapping type (1401). Conversely, if the length L' of the symbol for configuring the DMRS mapping interval is configured to 8 and mod(L, L')≠0, DMRS mapping may be performed using the PUSCH mapping type B (1402) of the related art. In the disclosure, the value of L' used in the above embodiment is not limited, and the value of L' may be configured through higher layer signaling or $L_1$ signaling.

Through the above method, in PUSCH repeated transmission type B having a long symbol, the DMRS may be efficiently located at a position other than the first symbol, thereby improving channel estimation performance. In addition, data transmission may be efficiently managed by adjusting the number of OFDM symbols of the DMRS. Therefore, the method may be used as a method for improving uplink coverage.

Third Embodiment

The third embodiment provides a method for configuring a PUSCH having 14 or more long symbols.

Figure 15:
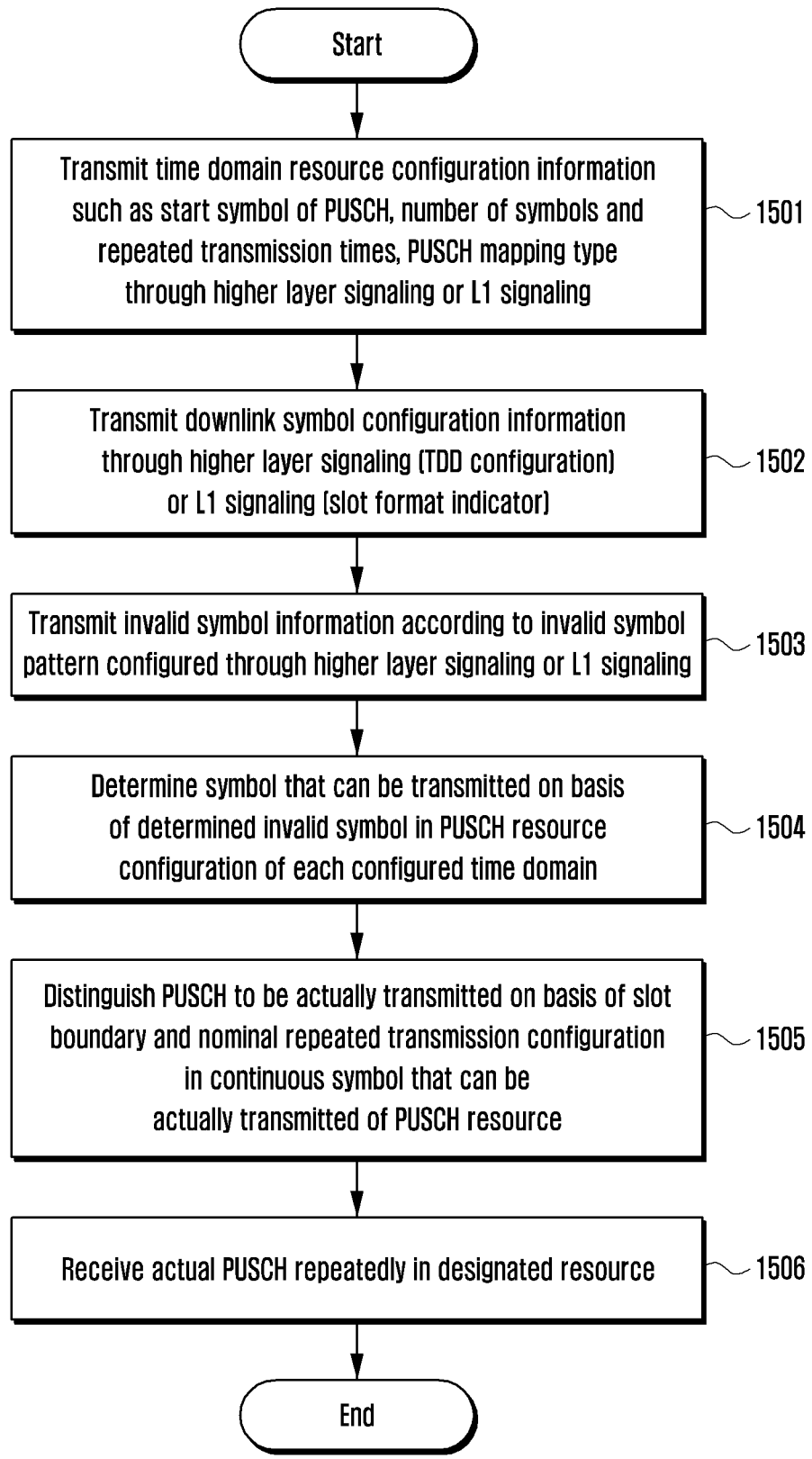
FIG. 15 is a flowchart illustrating an operation of a base station for actually configuring PUSCH repeated transmission, according to an embodiment of the disclosure.

FIG. 15 is a flowchart illustrating an operation of a base station for actually configuring PUSCH repeated transmission, according to an embodiment of the disclosure.

Referring to FIG. 15, the base station may transmit time domain resource configuration information, such as the start symbol of the PUSCH, the number of symbols and the number of repeated transmissions, and the PUSCH mapping type through higher layer signaling or $L_1$ signaling at operation 1501. Thereafter, the base station may transmit downlink symbol configuration information through higher layer signaling (TDD configuration) or $L_1$ signaling (Slot format indicator) at operation 1502. In addition, the base station transmits invalid symbol information according to the invalid symbol pattern configured through higher layer signaling or L1 signaling at operation 1503, and may determine a symbol in which the PUSCH can be transmitted by the UE based on the invalid symbol determined based on the downlink symbol configuration information or the invalid symbol pattern at operation 1504. The base station determines the actual repetition based on the slot boundary and nominal repetition configurations for a continuous symbol interval that can be actually transmitted of the PUSCH resource, and thus can identify the PUSCH resource to be actually transmitted by the UE at operation 1505. In this case, in order to receive a PUSCH having 14 or more long symbols, when the base station receives a PUSCH within a continuous valid symbol in the above method, the base station may divide consecutive symbols into one PUSCH actual repetition and repeatedly receive PUSCHs based on non-continuous symbols. Thereafter, the base station may repeatedly receive the actual PUSCH from the PSUCH resource to be actually transmitted by the UE at operation 1506.

Figure 16:
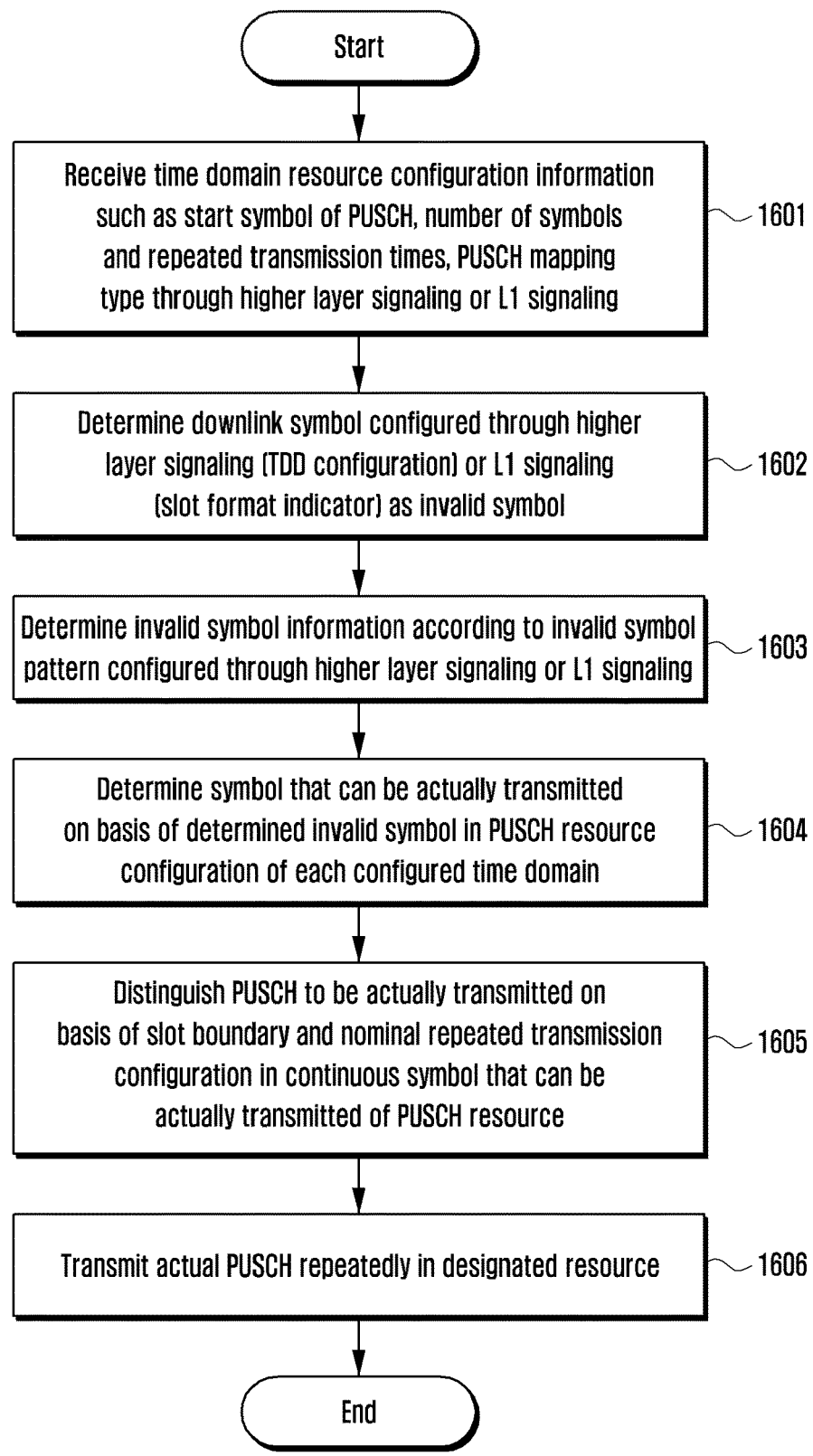
FIG. 16 is a flowchart illustrating an operation of a UE for actually receiving PUSCH repeated transmission, according to an embodiment of the disclosure.

FIG. 16 is a flowchart illustrating an operation of a UE for actually receiving PUSCH repeated transmission, according to an embodiment of the disclosure.

Referring to FIG. 16, the UE may receive time domain resource configuration information, such as the start symbol of the PUSCH, the number of symbols and the number of repeated transmissions, and the PUSCH mapping type through higher layer signaling or $L_1$ signaling at operation 1601. Thereafter, the UE may determine that the downlink symbol configured through higher layer signaling (TDD configuration) or $L_1$ signaling (Slot format indicator) is an invalid symbol at operation 1602. In addition, the UE determines the invalid symbol according to the invalid symbol pattern configured through higher layer signaling or $L_1$ signaling at operation 1603, and may determine a symbol capable of actually transmitting the PUSCH based on the invalid symbol determined based on the downlink symbol configuration or the invalid symbol pattern at operation 1604. In this case, the actual repetition may be determined based on the slot boundary and nominal repetition configurations for a continuous symbol interval that may be actually transmitted of the PUSCH resource, and accordingly, the PUSCH resource to be actually transmitted may be identified at operation 1605. In this case, for PUSCH transmission having 14 or more long symbols, when the UE transmits the PUSCH within the continuous valid symbols in the above method, the UE may divide consecutive symbols into one PUSCH actual repetition and repeatedly transmit PUSCH based on non-continuous symbols. Thereafter, the UE performs repeated actual PUSCH transmission on the identified PUSCH resource to be transmitted at operation 1606.

In order for the base station to receive a PUSCH with 14 or more long symbols, a method to distinguish the start symbol of the PUSCH having 14 or more long symbols transmitted from the UE, the length of the symbol, and the number of repeated transmissions and a method for the UE to configure the start symbol of the PUSCH, the length of the symbol, and the number of repeated transmissions for PUSCH transmission having 14 or more long symbols may be determined based on one of the following methods or a combination of one or more methods.

Method 1

According to method 1, in order to configure the PUSCH having a long symbol, it is possible to configure and use continuous actual repetition as one actual repetition without using the slot boundary and nominal repetition as a reference when configuring the actual repetition. After the actual repetition is determined based on the slot boundary and nominal repetition configuring according to the method described based on FIGS. 15 and 16, 1505 and 1605, if the determined actual repetition is continuous, the UE may transmit the continuous actual repetition by combining it into one actual repetition. According to the above method, operation may be possible without additional configuration for configuring a PUSCH having a long symbol.

Method 2

According to method 2, the length L' of actual repetition with a long symbol is determined based on the start symbol position S, the length L of the symbol, and the number of repetitions configured by higher layer signaling or $L_1$ signaling, and continuous actual repetitions in the L' section may be combined and transmitted as one actual repetition. For example, using the symbol length L and number of repetition n configured by higher layer signaling or $L_1$ signaling, the actual repetition length L' of the long symbol may be defined as L×n. In this case, actual repetition is not divided into nominal repetition, and the UE may transmit continuous actual repetition in L' section by combining it into one actual repetition. Through the above method, a PUSCH having a long symbol may be configured by utilizing information transmitted through higher layer signaling or $L_1$ signaling.

Method 3

According to method 3, the length L' of actual repetition with a long symbol is determined based on the start symbol position S, the length L of the symbol, and the number of slots in which PUSCH repeated transmission is performed configured by higher layer signaling or $L_1$ signaling, and continuous actual repetitions in the L' section may be combined and transmitted as one actual repetition. For example, the actual repetition symbol length L' having a long symbol may be defined as n×14 by using the number n of slots in which PUSCH repeated transmission is performed. In this case, L' may be configured as a multiple of 14 symbols in one slot.

Method 4

According to method 4, the length L' of actual repetition with a long symbol is determined so as to cover the entire period in which PUSCH repeated transmission is performed without limiting the range of the start symbol position S and the symbol length L configured by higher layer signaling or $L_1$ signaling, and continuous actual repetitions in the L' section may be combined and transmitted as one actual repetition. According to the method, complexity can be reduced by operating with a configuration value without calculating additional information.

In order to configure PUSCH actual repetition with a long symbol, it may be configured using a method of combining a start and length indicator value (SLIV) configuration method and actual repetition.

According to an embodiment of the disclosure, a method of operating a UE for determining a transport block size (TBS) according to a continuous symbol size based on a repeatedly transmitted physical uplink shared channel (PUSCH) and estimating a channel may include receiving repeated transmission configuration information for repeatedly transmitting a PUSCH, from a base station, receiving demodulation reference signal (DMRS) configuration information for determining a TBS according to a continuous symbol length and estimating a channel, from the base station, and repeatedly transmitting the PUSCH to the base station while performing DMRS mapping according to the DMRS pattern, based on the repeated transmission configuration information and the DMRS configuration information. According to an embodiment of the disclosure, a method of operating a base station for estimating a channel based on a repeatedly transmitted PUSCH may include: transmitting repeated transmission configuration information for repeatedly transmitting a PUSCH, to a UE, transmitting DMRS configuration information for determining a TBS according to a continuous symbol length and estimating a channel, to the UE, repeatedly receiving the PUSCH which is repeatedly transmitted while performing DMRS mapping according to the DMRS pattern, based on the repeated transmission configuration information and the DMRS configuration information, from the UE, and estimating a channel by using a DMRS included in the PUSCHs transmitted according to the DMRS configuration.

Figure 17:
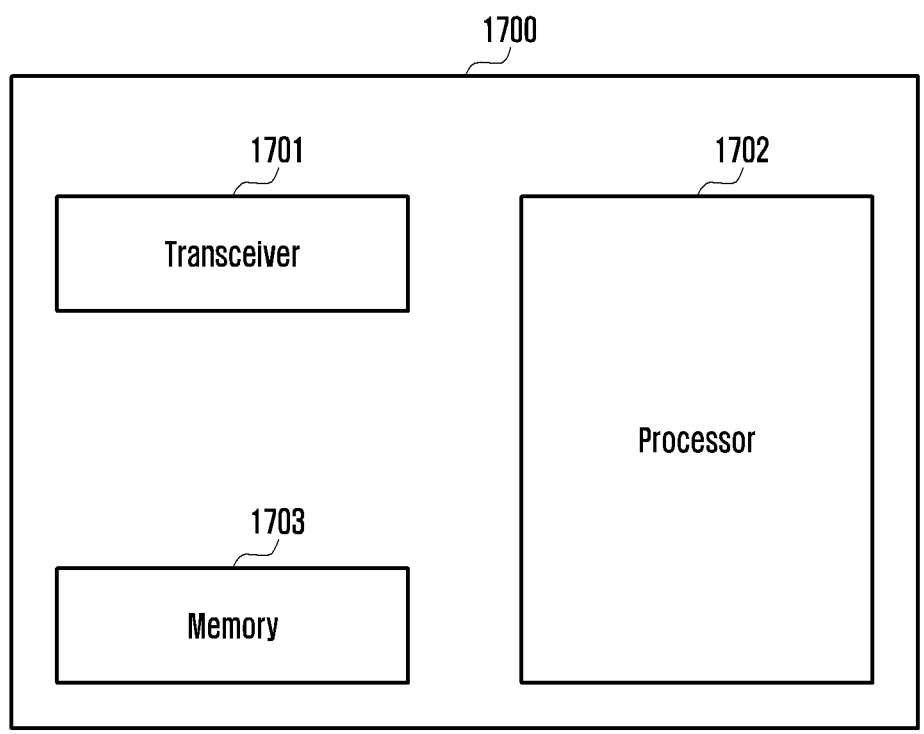
FIG. 17 is a block diagram of a UE according to an embodiment of the disclosure.

FIG. 17 is a block diagram of a UE according to an embodiment of the disclosure.

Referring to FIG. 17, a UE 1700 may include a transceiver 1701, a controller (processor) 1702, and a storage unit (memory) 1703. According to an efficient channel and signal transmission/reception method in the 5G communication system corresponding to the above-described embodiment of the disclosure, the transmission/reception unit 1701, the controller 1702, and the memory 1703 of the UE 1700 may operate. However, components of the UE 1700 according to an embodiment are not limited to the above-described example. According to another embodiment of the disclosure, the UE 1700 may include more or fewer components than the aforementioned components. In addition, in a specific case, the transceiver 1701, the controller 1702, and the memory 1703 may be implemented in the form of a single chip.

The transceiver 1701 may be including a transmitter and a receiver according to another embodiment. The transceiver 1701 may transmit/receive a signal to/from the base station. The signal may include control information and data. To this end, the transceiver 1701 may include an RF transmitter for up-converting and amplifying a frequency of a transmitted signal, and an RF receiver for low-noise amplifying and down-converting a received signal. In addition, the transceiver 1701 may receive a signal through a wireless channel and output it to the controller 1702, and transmit the signal output from the controller 1702 through the wireless channel.

The controller 1702 may control a series of processes in which the UE 1700 may operate according to the above-described embodiment. For example, the controller 1702 may perform a method of changing an OFDM symbol position of a DMRS based on a method of estimating a channel by using DMRSs transmitted in a plurality of PUSCHs simultaneously according to an embodiment. To this end, the controller 1702 may include at least one processor. For example, the controller 1702 may include a communication processor (CP) that controls for communication and an application processor (AP) that controls a higher layer, such as an application program.

The memory 1703 may store control information or data, such as information related to channel estimation using DMRSs transmitted in a PUSCH included in a signal obtained from the UE 1700, or the like, and may have an area for storing data required for control by the controller 1702 and data generated during control by the controller 1702.

Figure 18:
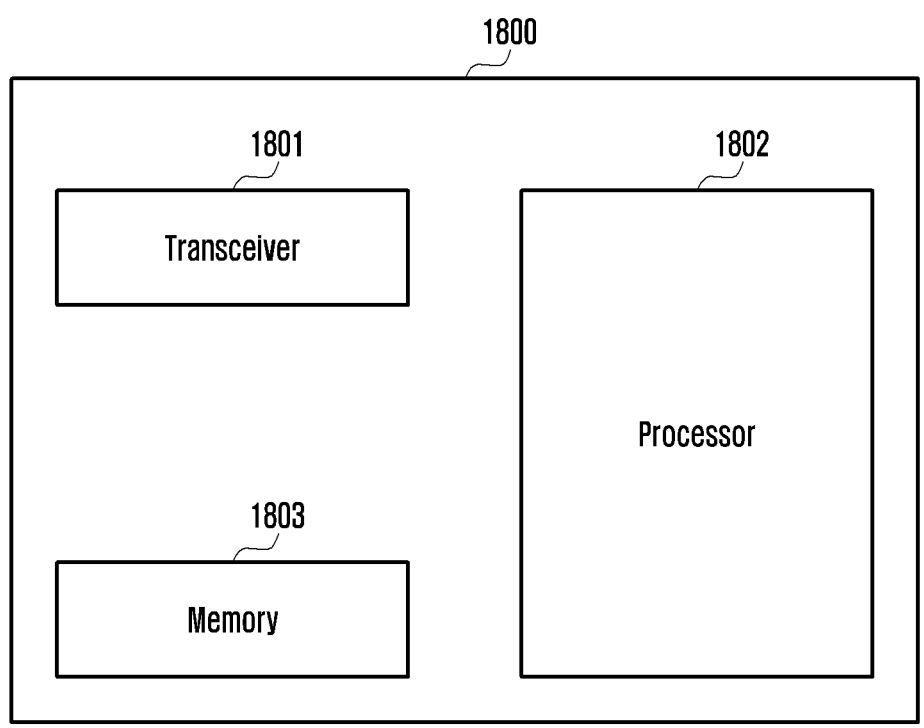
FIG. 18 is a block diagram of a base station according to an embodiment of the disclosure.

FIG. 18 is a block diagram of a base station according to an embodiment of the disclosure.

Referring to FIG. 18, a base station 1800 may include a transceiver 1801, a controller (processor) 1802, and a storage unit (memory) 1803. According to an efficient channel and signal transmission/reception method in the 5G communication system corresponding to the above-described embodiment of the disclosure, the transmission/reception unit 1801, the controller 1802, and the memory 1803 of the base station 1800 may operate. However, components of the base station 1800 according to an embodiment are not limited to the above-described example. According to another embodiment of the disclosure, the base station 1800 may include more or fewer components than the aforementioned components. In addition, in a specific case, the transceiver 1801, the controller 1802, and the memory 1803 may be implemented in the form of a single chip.

The transceiver 1801 may be including a transmitter and a receiver according to another embodiment. The transceiver 1801 may transmit/receive a signal to/from the UE. The signal may include control information and data. To this end, the transceiver 1801 may include an RF transmitter for up-converting and amplifying a frequency of a transmitted signal, and an RF receiver for low-noise amplifying and down-converting a received signal. In addition, the transceiver 1801 may receive a signal through a wireless channel and output it to the controller 1802, and transmit the signal output from the controller 1802 through the wireless channel.

The controller 1802 may control a series of processes in which the base station 1800 may operate according to the above-described embodiment. For example, the controller 1802 may perform a method of changing an OFDM symbol position of a DMRS based on a method of estimating a channel by using DMRSs transmitted in a plurality of PUSCHs simultaneously according to an embodiment. To this end, the controller 1802 may include at least one processor. For example, the controller 1802 may include a communication processor (CP) that controls for communication and an application processor (AP) that controls a higher layer, such as an application program.

The memory 1803 may store control information, such as information related to channel estimation, data, or control information and data received from the UE using DMRSs transmitted in the PUSCH determined by the base station 1800, and may have an area for storing data required for control by the controller 1802 and data generated during control by the controller 1802.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   identifying that a number of symbol for a physical uplink shared channel (PUSCH) is larger than a predetermined number of symbols;
   identifying a number of resource element (RE) for PUSCH in one physical resource block (PRB), based on the number of symbol for the PUSCH that is larger than the predetermined number of symbols;

identifying a number of RE for the PUSCH in allocated PRBs, based on the number of RE for PUSCH in one PRB;
identifying transport block size (TBS) for the PUSCH based on the number of RE for PUSCH in allocated PRBs; and
transmitting the PUSCH to a base station based on the TBS,
wherein a PUSCH mapping type for the PUSCH is based on a first symbol length corresponding to a number of symbols for a demodulation reference signal (DMRS) mapping interval configuration, and a second symbol length corresponding to the number of symbols for the PUSCH.

2. The method of claim 1,
wherein the number of RE for PUSCH in allocated PRBs is identified based on a minimum value between a value determined according to the number of symbols for the PUSCH and the number of RE for the PUSCH in one PRB, and
wherein the number of RE for the PUSCH allocated PRBs.

3. The method of claim 1, wherein a demodulation reference signal (DMRS) for the PUSCH is mapped according to a PUSCH mapping type, in an interval partitioned based on the predetermined number of symbols.

4. The method of claim 3, wherein the DMRS is omitted in the interval, in case that a symbol length of the interval is smaller than or equal to a threshold.

5. The method of claim 1, wherein a demodulation reference signal (DMRS) for the PUSCH is mapped according to a PUSCH mapping type, in an interval partitioned based on a slot boundary.

6. The method of claim 5, wherein the DMRS is omitted in the interval, in case that a symbol length of the interval is smaller than or equal to a threshold.

7. The method of claim 1, wherein the PUSCH mapping type is identified based on a modulo operation using the first symbol length and the second symbol length.

8. A terminal in a communication system, the terminal comprising:
a transceiver; and
at least one processor configured to:
identify that a number of symbol for a physical uplink shared channel (PUSCH) is larger than a predetermined number of symbols,
identify a number of resource element (RE) for PUSCH in one physical resource block (PRB), based on the number of symbol for the PUSCH that is larger than the predetermined number of symbols,
identify a number of RE for the PUSCH in allocated PRBs, based on the number of RE for PUSCH in one PRB,
identify transport block size (TBS) for the PUSCH based on the number of RE for PUSCH in allocated PRBs, and
transmit the PUSCH to a base station based on the TBS,
wherein a PUSCH mapping type for the PUSCH is based on a first symbol length corresponding to a number of symbols for a demodulation reference signal (DMRS) mapping interval configuration, and a second symbol length corresponding to the number of symbols for the PUSCH.

9. The terminal of claim 8,
wherein the number of RE for PUSCH in allocated PRBs is identified based on a minimum value between a value determined according to the number of symbols for the PUSCH and the number of RE for the PUSCH in one PRB, and
wherein the number of RE for the PUSCH allocated PRBs.

10. The terminal of claim 8, wherein a demodulation reference signal (DMRS) for the PUSCH is mapped according to a PUSCH mapping type, in an interval partitioned based on the predetermined number of symbols.

11. The terminal of claim 10, wherein the DMRS is omitted in the interval, in case that a symbol length of the interval is smaller than or equal to a threshold.

12. The terminal of claim 8, wherein a demodulation reference signal (DMRS) for the PUSCH is mapped according to a PUSCH mapping type, in an interval partitioned based on a slot boundary.

13. The terminal of claim 12, wherein the DMRS is omitted in the interval, in case that a symbol length of the interval is smaller than or equal to a threshold.

14. The terminal of claim 8, wherein the PUSCH mapping type is identified based on a modulo operation using the first symbol length and the second symbol length.

15. A method performed by a base station in a communication system, the method comprising:
identifying that a number of symbols for a physical uplink shared channel (PUSCH) is larger than a predetermined number of symbols;
identifying a number of resource element (RE) for PUSCH in one physical resource block (PRB), based on the number of symbols for the PUSCH that is larger than the predetermined number of symbols;
identifying a number of RE for the PUSCH in allocated PRBs, based on the number of RE for PUSCH in one PRB;
identifying transport block size (TBS) for the PUSCH based on the number of RE for PUSCH in allocated PRBs; and
receiving the PUSCH from a terminal based on the TBS,
wherein a PUSCH mapping type for the PUSCH is based on a first symbol length corresponding to a number of symbols for a demodulation reference signal (DMRS) mapping interval configuration, and a second symbol length corresponding to the number of symbols for the PUSCH.

16. The method of claim 15,
wherein the number of RE for PUSCH in allocated PRBs is identified based on a minimum value between a value determined according to the number of symbols for the PUSCH and the number of RE for the PUSCH in one PRB, and
wherein the number of RE for the PUSCH allocated PRBs.

17. A base station in a communication system, the base station comprising:
a transceiver; and
at least one processor configured to:
identify that a number of symbols for a physical uplink shared channel (PUSCH) is larger than a predetermined number of symbols,
identify a number of resource element (RE) for PUSCH in one physical resource block (PRB), based on the number of symbols for the PUSCH that is larger than the predetermined number of symbols,
identify a number of RE for the PUSCH in allocated PRBs, based on the number of RE for PUSCH in one PRB, identify transport block size (TBS) for the PUSCH based on the number of RE for PUSCH in allocated PRBs, and receive the PUSCH from a terminal based on the TBS, wherein a PUSCH mapping type for the PUSCH is based on a first symbol length corresponding to a number of symbols for a demodulation reference signal (DMRS) mapping interval configuration, and a second symbol length corresponding to the number of symbols for the PUSCH.

18. The base station of claim 17, wherein the number of RE for PUSCH in allocated PRBs is identified based on a minimum value between a value determined according to the number of symbols for the PUSCH and the number of RE for the PUSCH in one PRB, and wherein the number of RE for the PUSCH allocated PRBs.

* * * * *